United States Patent
Gopalakrishnan et al.

(10) Patent No.: US 10,812,774 B2
(45) Date of Patent: Oct. 20, 2020

(54) METHODS AND DEVICES FOR ADAPTING THE RATE OF VIDEO CONTENT STREAMING

(71) Applicants: AT&T Intellectual Property I, L.P., Atlanta, GA (US); THE TRUSTEES OF INDIANA UNIVERSITY, Bloomington, IN (US)

(72) Inventors: Vijay Gopalakrishnan, Edison, NJ (US); Bo Han, Bridgewater, NJ (US); Jackson Jarrell Pair, Marina Del Rey, CA (US); Vikash Sharma, Marina Del Rey, CA (US); Feng Qian, Bloomington, IN (US)

(73) Assignees: AT&T INTELLECTUAL PROPERTY I, L.P., Atlanta, GA (US); The Trustees of Indiana University, Bloomington, IN (US)

( * ) Notice: Subject to any disclaimer, the term of this patent is extended or adjusted under 35 U.S.C. 154(b) by 95 days.

(21) Appl. No.: 16/001,418

(22) Filed: Jun. 6, 2018

(65) Prior Publication Data
US 2019/0379875 A1     Dec. 12, 2019

(51) Int. Cl.
*H04N 13/161* (2018.01)
*H04N 19/30* (2014.01)
(Continued)

(52) U.S. Cl.
CPC ......... *H04N 13/161* (2018.05); *H04N 13/366* (2018.05); *H04N 19/30* (2014.11);
(Continued)

(58) Field of Classification Search
CPC .... H04N 13/161; H04N 13/366; H04N 19/30; H04N 19/167; H04N 19/176; H04N 19/187; H04N 19/119
See application file for complete search history.

(56) References Cited

U.S. PATENT DOCUMENTS

| 6,665,002 B2 | 12/2003 | Liu |
| 7,428,022 B2 | 9/2008 | Teichner et al. |

(Continued)

FOREIGN PATENT DOCUMENTS

| CN | 106919248 A | 7/2017 |
| GB | 2538531 A | 11/2016 |

(Continued)

OTHER PUBLICATIONS

Afzal, Shahryar et al., "Characterization of 360-degree Videos", VR/AR Network '17, Aug. 25, 2017, Los Angeles, CA, USA, Association for Computing Machinery, ACM ISBN 978-1-4503-5055—Jun. 17, 2008, Jun. 17, 2008.

(Continued)

*Primary Examiner* — Joseph Suh
(74) *Attorney, Agent, or Firm* — Guntin & Gust, PLC; Atanu Das

(57) ABSTRACT

Aspects of the subject application may include, for example, identifying FOV and OOS tiles of the video content. The FOV and OOS tiles are received from a video server. The FOV and OOS tiles are encoded using AVC and a first layer of SVC, respectively. Further embodiments include providing the FOV and OOS tiles for presentation on a display, detecting a change in a field of vision, and identifying other FOV tiles of the video content, which comprise a portion of the OOS tiles. Also, embodiments include requesting the portion of the OOS tiles and receiving the portion of the OOS tiles from the video server over the communication network, which are encoded using an enhancement layer of SVC and then provided, to the display, according the enhancement layer in conjunction with the providing of the OOS tiles according to the first layer. Other embodiments are described herein.

20 Claims, 16 Drawing Sheets

(51) Int. Cl.
| | |
|---|---|
| *H04N 13/366* | (2018.01) |
| *H04N 19/187* | (2014.01) |
| *H04N 19/176* | (2014.01) |
| *H04N 19/167* | (2014.01) |
| *H04N 19/119* | (2014.01) |

(52) U.S. Cl.
CPC .......... *H04N 19/119* (2014.11); *H04N 19/167* (2014.11); *H04N 19/176* (2014.11); *H04N 19/187* (2014.11)

(56) References Cited

U.S. PATENT DOCUMENTS

| | | | |
|---|---|---|---|
| 7,817,181 | B2 | 10/2010 | Lee |
| 8,379,670 | B2 | 2/2013 | Le et al. |
| 8,947,498 | B2 | 2/2015 | Wang |
| 9,131,257 | B2 | 9/2015 | Russo et al. |
| 9,311,692 | B1* | 4/2016 | Jia .................... G06F 3/04845 |
| 9,321,703 | B2 | 4/2016 | Nyce et al. |
| 9,392,102 | B2 | 7/2016 | Zhou |
| 9,554,160 | B2 | 1/2017 | Han et al. |
| 9,589,255 | B1 | 3/2017 | Sandrew |
| 9,589,434 | B2 | 3/2017 | Siann et al. |
| 9,621,871 | B2 | 4/2017 | Toma et al. |
| 9,635,252 | B2 | 4/2017 | Accardo et al. |
| 9,648,318 | B2 | 5/2017 | Li et al. |
| 9,686,520 | B2 | 6/2017 | Degtyarev et al. |
| 9,699,437 | B2 | 7/2017 | Cole et al. |
| 9,710,973 | B2 | 7/2017 | Bar-Zeev et al. |
| 9,787,896 | B2 | 10/2017 | Fink et al. |
| 9,813,465 | B2 | 11/2017 | Petria et al. |
| 9,813,673 | B2 | 11/2017 | Smits |
| 9,847,079 | B2 | 12/2017 | Clement et al. |
| 9,897,807 | B2 | 2/2018 | Giokaris et al. |
| 9,912,717 | B2 | 3/2018 | Ha et al. |
| 9,918,136 | B2 | 3/2018 | Cole et al. |
| 9,929,879 | B2 | 3/2018 | Herrero |
| 2003/0233464 | A1 | 12/2003 | Walpole et al. |
| 2006/0013495 | A1 | 1/2006 | Duan et al. |
| 2007/0019740 | A1 | 1/2007 | Budagavi et al. |
| 2007/0263904 | A1* | 11/2007 | Muramatsu ............ G03B 15/16 382/107 |
| 2011/0069147 | A1 | 3/2011 | Lin et al. |
| 2011/0216833 | A1 | 9/2011 | Chen et al. |
| 2012/0291080 | A1 | 11/2012 | Mccutchen et al. |
| 2014/0013361 | A1 | 1/2014 | Monari et al. |
| 2014/0247324 | A1 | 9/2014 | Cury et al. |
| 2014/0267420 | A1* | 9/2014 | Schowengerdt ........ G06F 3/012 345/633 |
| 2014/0313989 | A1 | 10/2014 | Doken et al. |
| 2014/0351835 | A1* | 11/2014 | Orlowski ......... H04N 21/44204 725/9 |
| 2015/0023430 | A1 | 1/2015 | Choi et al. |
| 2015/0063211 | A1 | 3/2015 | Kim et al. |
| 2015/0271493 | A1 | 9/2015 | Okazaki |
| 2015/0312582 | A1* | 10/2015 | Minoo .................. H04N 19/70 375/240.02 |
| 2015/0346812 | A1 | 12/2015 | Cole et al. |
| 2016/0027141 | A1 | 1/2016 | Patel et al. |
| 2016/0073023 | A1 | 3/2016 | Rondinelli et al. |
| 2016/0088282 | A1* | 3/2016 | Sadi .................... H04N 13/254 |
| 2016/0100332 | A1 | 4/2016 | Yi et al. |
| 2016/0150212 | A1 | 5/2016 | Moura et al. |
| 2016/0260196 | A1 | 9/2016 | Roimela et al. |
| 2016/0277772 | A1 | 9/2016 | Campbell et al. |
| 2016/0286251 | A1 | 9/2016 | Kopka |
| 2016/0352791 | A1 | 12/2016 | Adams et al. |
| 2016/0360180 | A1 | 12/2016 | Cole et al. |
| 2016/0373725 | A1 | 12/2016 | Pastor |
| 2017/0078351 | A1 | 3/2017 | Von et al. |
| 2017/0078921 | A1 | 3/2017 | Xia et al. |
| 2017/0085484 | A1 | 3/2017 | Hellander et al. |
| 2017/0094261 | A1 | 3/2017 | Teslenko |
| 2017/0115488 | A1 | 4/2017 | Ambrus et al. |
| 2017/0126416 | A1 | 5/2017 | Mccormick et al. |
| 2017/0188058 | A1 | 6/2017 | Nakashima et al. |
| 2017/0220816 | A1 | 8/2017 | Matusek et al. |
| 2017/0223395 | A1 | 8/2017 | Elliot et al. |
| 2017/0244948 | A1 | 8/2017 | Pang et al. |
| 2017/0251204 | A1 | 8/2017 | Gupte et al. |
| 2017/0287446 | A1 | 10/2017 | Young et al. |
| 2017/0289219 | A1 | 10/2017 | Khalid et al. |
| 2017/0316543 | A1 | 11/2017 | Pieters |
| 2017/0318126 | A1 | 11/2017 | Breitenfeld et al. |
| 2017/0332117 | A1 | 11/2017 | Haritaoglu et al. |
| 2017/0336705 | A1 | 11/2017 | Zhou et al. |
| 2017/0339391 | A1 | 11/2017 | Zhou et al. |
| 2017/0339415 | A1 | 11/2017 | Wang et al. |
| 2017/0344843 | A1 | 11/2017 | Wang et al. |
| 2017/0347026 | A1 | 11/2017 | Hannuksela |
| 2017/0347084 | A1 | 11/2017 | Boyce |
| 2017/0352191 | A1 | 12/2017 | Zhou |
| 2017/0359586 | A1 | 12/2017 | Xue et al. |
| 2017/0374127 | A1 | 12/2017 | Hosur |
| 2017/0374375 | A1 | 12/2017 | Makar et al. |
| 2017/0374411 | A1 | 12/2017 | Lederer et al. |
| 2018/0020204 | A1 | 1/2018 | Pang et al. |
| 2018/0027258 | A1 | 1/2018 | Tech et al. |
| 2018/0035134 | A1 | 2/2018 | Pang et al. |
| 2018/0081149 | A1 | 3/2018 | Bae et al. |
| 2018/0130323 | A1 | 5/2018 | Zhang |
| 2018/0139434 | A1* | 5/2018 | Roe .................... H04N 13/15 |
| 2018/0146216 | A1 | 5/2018 | Chang et al. |
| 2018/0191868 | A1 | 7/2018 | Wang et al. |
| 2018/0191952 | A1 | 7/2018 | Ardo et al. |
| 2018/0359189 | A1 | 12/2018 | Ye et al. |
| 2019/0005575 | A1* | 1/2019 | Zeldin .................. G06Q 30/08 |
| 2019/0058856 | A1* | 2/2019 | Bostick ............... H04N 9/8715 |
| 2019/0373298 | A1 | 12/2019 | Han et al. |
| 2019/0379875 | A1 | 12/2019 | Gopalakrishnan et al. |
| 2020/0007905 | A1 | 1/2020 | Han et al. |
| 2020/0053390 | A1 | 2/2020 | Han et al. |

FOREIGN PATENT DOCUMENTS

| | | | |
|---|---|---|---|
| KR | 101808639 | B1 | 1/2018 |
| WO | 9321703 | A1 | 10/1993 |
| WO | 9742601 | A1 | 11/1997 |
| WO | 2015183887 | A1 | 12/2015 |
| WO | 2016058279 | A1 | 4/2016 |
| WO | 2017093611 | A1 | 6/2017 |
| WO | 2017140945 | A1 | 8/2017 |
| WO | 2017140948 | A1 | 8/2017 |
| WO | 2017205642 | A1 | 11/2017 |
| WO | 2017205794 | | 11/2017 |
| WO | 2018004239 | A1 | 1/2018 |
| WO | 2018011054 | A1 | 1/2018 |
| WO | 2018041244 | | 3/2018 |
| WO | 2018049221 | | 3/2018 |

OTHER PUBLICATIONS

Bao, Yanan et al., "Motion-Prediction-Based Multicast for 360-Degree Video Transmissions", IEEE, 2017, 9.

Bao, Yanan , "Shooting a Moving Target: Motion-Prediction-Based Transmission for 360-Degree Videos", 2016 IEEE International Conference on Big Data, 10 pages.

Boos, Kevin et al., "FlashBack: Immersive Virtual Reality on Mobile Devices via Rendering Memoization", MobiSys'16, Jun. 25-30, 2016, Singapore, Singapore ACM. ISBN 978-1-4503-4269, Aug. 16, 2006.

Budagavi, Madhukar et al., "360 Degrees Video Coding Using Region Adaptive Smoothing", 2015 IEEE, Samsung Research America, Dallas Northwestern University, Evanston, IL, 2015, 5 pages.

Corbillon, et al., "Optimal Set of 360-Degree Videos for Viewport-Adaptive Streaming", MM '17, Oct. 23-27, 2017, Mountain View, CA, 9 pages.

Corbillon, et al., "Viewport-Adaptive Navigable 360-Degree Video Delivery", 2017 IEEE International Conference, 7 pages.

Corbillon, Xavier et al., "360-degree video head movement dataset", Proceedings of the 8th ACM on Multimedia Systems Conference, ACM, 2017, 6 pages.

(56) References Cited

OTHER PUBLICATIONS

De Cock, Jan et al., "A Large-Scale Video Codec Comparison of x264, x265 and libvpx for Practical VOD Applications", Applications of Digital Image Processing XXXIX, 2016, 17 pages.

Duanmu, Fanyi et al., "Prioritized Buffer Control in Two-tier 360 Video Streaming", In Proceedings of VR/AR Network '17, Los Angeles, CA, USA, Aug. 25, 2017,, 6 pages.

Fan, Ching-Ling et al., "Fixation Prediction for 360 Video Streaming in Head-Mounted Virtual Reality", In Proceedings of NOSSDAV'17, Taipei, Taiwan, Jun. 20-23, 2017, 6 pages., Jun. 20, 2017, 6.

Gaddam, Vamsidhar et al., "Tiling in Interactive Panoramic Video: Approaches and Evaluation", IEEE Transactions on Multimedia, vol. 18, No. 9, Sep. 2016, 13 pages.

Graf, Mario et al., "Towards bandwidth efficient adaptive streaming of omnidirectional video over http: Design, implementation, and evaluation", Proceedings of the 8th ACM on Multimedia Systems Conference, ACM, 2017.

Hamza, Ahmed et al., "Adaptive Streaming of Interactive Free Viewpoint Videos to Heterogeneous Clients", MMSys '16, May 10-13, Klagenfurt, Austria, ACM, ISBN 978-1-4503-4297, Jan. 16, 2005.

Hosseini, et al., "Adaptive 360 VR Video Streaming: Divide and Conquer", 2016 IEEE International Symposium, 4 pages.

Huang, Te-Yuan et al., "A Buffer-Based Approach to Rate Adaptation: Evidence from a Large Video Streaming Service", SIGCOMM'14, Aug. 17-22, 2014, Chicago, Illinois, USA., 2014, 12 pages.

Inoue, Masayuki et al., "Interactive Panoramic Video Streaming System over Restricted Bandwidth Network", Proceedings of the 18th ACM international conference on Multimedia. ACM, 2010., 2010, 4 pages.

Jiang, Junchen et al., "Improving Fairness, Efficiency, and Stability in HTTP-based Adaptive Video Streaming with FESTIVE", CoNEXT'12, Dec. 10-13, 2012, Nice, France, Dec. 2012, 97-108.

Ju, Ran et al., "Ultra Wide View Based Panoramic VR Streaming", In Proceedings of VR/AR Network '17, Los Angeles, CA, USA, Aug. 25, 2017,, 5 pages.

Kammachi-Sreedhar, Kashyap et al., "Viewport-adaptive Encoding and Streaming of 360-degree Video for Virtual Reality Applications", 2016 IEEE International Symposium on Multimedia, 4 pages.

Lai, Zeqi et al., "Furion: Engineering High-Quality Immersive Virtual Reality on Today's Mobile Devices", MobiCom'17, Oct. 16-20, 2017, Snowbird, UT, USA.Association for Computing Machinery. ACM ISBN 978-1-4503-4916—Jan. 17, 2010., Jan. 17, 2010.

Le Feuvre, Jean et al., "Tiled-based Adaptive Streaming using MPEG-DASH", MMSys'16, May 10-13, 2016, Klagenfurt.

Li, Jiwei et al., "Smartphone-Assisted Smooth Live Video Broadcast on Wearable Cameras", Quality of Service (IWQoS), 2016 IEEE/ACM 24th International Symposium, IEEE, 2016., 2016, 6 pages.

Li, Tianxing et al., "Ultra-Low Power Gaze Tracking for Virtual Reality", SenSys '17, Nov. 6-8, 2017, Netherlands, 14 pages.

Liu, Xing et al., "360° Innovations for Panoramic Video Streaming", Proceedings of the 16th ACM Workshop on Hot Topics in Networks. ACM, 2017., 2017, 7 pages.

Lo, Wen-Chih et al., "360 Video Viewing Dataset in Head-Mounted Virtual Reality", 2017 ACM, 2017, 6 pages.

Lo, Wen-Chih , "Performance Measurements of 360 Video Streaming to Head-Mounted Displays Over Live 4G Cellular Networks", Accessed Jul. 25, 2018, 6 pages.

Mangiante, Simone et al., VR is on the Edge: How to Deliver 360 degrees Videos in Mobile Networks; Conference: the Workshop, researchgate.net, DOI: 10.1145/3097895.3097901, (Aug. 2017), pp. 1-18.

Mao, Hongzi et al., "Neural Adaptive Video Streaming with Pensieve", SIGCOMM '17, Los Angeles, CA, USA, Aug. 21, 2017, 14.

Nasrabadi, et al., "Adaptive 360-Degree Video Streaming using Scalable Video Coding", MM '17, Oct. 23-27, 2017, Mountain View, CA, ISBN 978-1-4503-4909, Feb. 7, 2010.

Ng, Kinig-To et al., "Data Compression and Transmission Aspects of Panoramic Videos", IEEE Transactions on Circuits and Systems for Video Technology 15.1 (2005): 82-95., Jan. 2005, 15 pages.

Ochi, Daisuke et al., "HMD Viewing Spherical Video Streaming System", MM'14, Nov. 3-7, 2014, Orlando, Florida, USA., Nov. 3, 2014, 2.

Ochi, Daisuke et al., "Live Streaming System for Omnidirectional Video", IEEE Virtual Reality Conference, Aires, France, Mar. 23, 2015.

Petrangeli, Stefano et al., "An HTTP/2-Based Adaptive Streaming Framework for 360 Virtual Reality Videos", Proceedings of the 2017 ACM on Multimedia Conference, ACM, 2017., Oct. 23-27, 2017, 9 pages.

Qian, Feng et al., "Optimizing 360 Video Delivery Over Cellular Networks", Proceedings of the 5th Workshop on All Things Cellular: Operations, Applications and Challenges, ACM, 2016., Oct. 3-7, 2016, 6 pages.

Rai, Yashas et al., "A Dataset of Head and Eye Movements for 360 Degree Images", MMSys'17, Taipei, Taiwan; 2017 ACM., 2017, 6 pages.

Sanchez, Yago et al., "Spatio-Temporal Activity based Tiling for Panorama Streaming", NOSSDAV'17, Jun. 20-23, 2017, Taipei, Taiwan., 6 pages.

Toni, Laura et al., "Interactive Free Viewpoint Video Streaming Using Prioritized Network Coding", Multimedia Signal Processing (MMSP), 2013 IEEE 15th International Workshop, IEEE, 2013., Sep. 30, 2013, 6 pages.

Van Den Broeck, Marc et al., "It's All Around You: Exploring 360 Video Viewing Experiences on Mobile Devices", MM'17, Oct. 23-27, 2017, Mountain View, CA, USA, 2017, 7.

Wang, Hui et al., "Mixing Tile Resolutions in Tiled Video: A Perceptual Quality Assessment", NOSSDAV'14, Mar. 19-21, 2014, Singapore, Singapore., Mar. 19, 2014, 6.

Wu, Chenglei et al., "A Dataset for Exploring User Behaviors in VR Spherical Video Streaming", MMSys'17, Taipei, Taiwan; 2017 ACM., 2017, 6 pages.

Wu, Po-Han et al., "Video-Quality-Driven Resource Allocation for Real-Time Surveillance Video Uplinking Over OFDMA-Based Wireless Networks", IEEE Transactions on Vehicular Technology 64.7 (2015): 3233-3246., Jul. 2015, 14 pages.

Xiao, et al., "OpTile: Toward Optimal Tiling in 360-degree Video Streaming", In Proceedings of MM '17, Mountain View, CA, USA, Oct. 23-27, 2017,, 9 pages.

Xie, Lan et al., "360ProbDASH: Improving QoE of 360 Video Streaming Using Tile-based HTTP Adaptive Streaming", 2017 Association for Computing Machinery., 2017, 9 pages.

Xie, Xiufeng et al., "POI360: Panoramic Mobile Video Telephony over LTE Cellular Networks", CoNEXT '17, Dec. 12-15, 2017, Incheon, Republic of Korea, 2017, 14 pages.

Yin, Xiaoqi et al., "A Control-Theoretic Approach for Dynamic Adaptive Video Streaming over HTTP", SIGCOMM '15, Aug. 17-21, 2015, London, United Kingdom; 2015 ACM, 2015, 14 pages.

Yu, Matt et al., "A Framework to Evaluate Omnidirectional Video Coding Schemes", 2015 IEEE International Symposium on Mixed and Augmented Reality,, 6 pages.

Zare, Alireza et al., "HEVC-compliant Tile-based Streaming of Panoramic Video for Virtual Reality Applications", MM '16, Oct. 15-19, 2016, Amsterdam, Netherlands, Oct. 15, 2016, 5.

Zhou, Chao , "A Measurement Study of Oculus 360 Degree Video Streaming", MMSys'17, Jun. 20-23, 2017, Taipei, Taiwan, 11 pages.

"360 Degree Video Streaming Over Next-Gen Communication Networks", NYU Wireless, wireless.engineering.nyu.edu, Apr. 7, 2017.

Farr, Kieran , "Using Microservices and Containers for Video Encoding", bitmovin.com, Mar. 23, 2018.

Hosseini, et al., "Adaptive 360 VR video streaming based on MPEG-DASH SRD", Multimedia (ISM), 2016 IEEE International Symposium, IEEE, 2016, 2 pages.

Hosseini, et al., "Adaptive 360 VR video streaming: Divide and conquer", Multimedia (ISM), 2016 IEEE International Symposium, IEEE, 2016, 6 pages.

(56) References Cited

OTHER PUBLICATIONS

Liu, et al., "360 Innovations for Panoramic Video Streaming", Proceedings of the 16th ACM Workshop on Hot Topics in Networks, ACM, 2017, 7 pages.

Nasrabadi, et al., "Adaptive 360-Degree Video Streaming using Scalable Video Coding", Proceedings of the 2017 ACM on Multimedia Conference, ACM, 2017, 9 pages.

Nasrabadi, Afshin T., "Adaptive 360-Degree Video Streaming using Layered Video Coding", IEEE Virtual Reality, Mar. 18-22, 2017, 347-348.

Wang, , "LIAITHON: A location-aware multipath video streaming scheme for urban vehicular networks", Computers and Communications (ISCC), 2012 IEEE Symposium, IEEE, 2012, 6 pages.

Zhao, et al., "SDN-Assisted adaptive streaming framework for tile-based immersive content using MPEG-DASH", Network Function Virtualization and Software Defined Networks (NFV-SDN), 2017 IEEE Conference, 6 pages.

\* cited by examiner

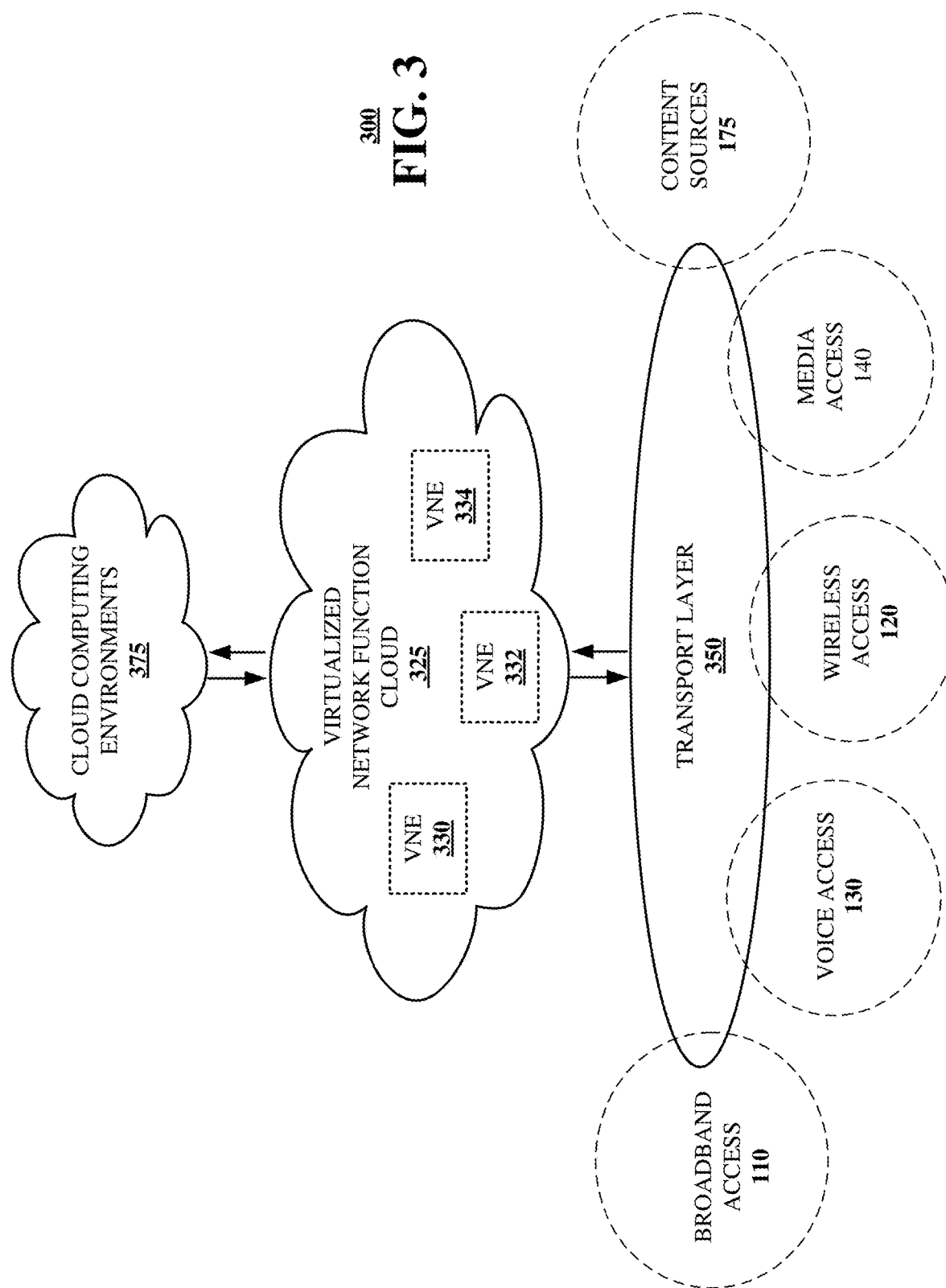

METHODS AND DEVICES FOR ADAPTING THE RATE OF VIDEO CONTENT STREAMING

FIELD OF THE DISCLOSURE

The subject disclosure relates to methods and devices for adapting the rate of video content streaming.

BACKGROUND

Video content has become a ubiquitous medium on the Internet including on social media, news, entertainment, and informational websites or platforms. Further, many of the video content can be accessed from smartphones and tablet computers by users that are communicatively coupled to either cellular or WiFi networks. In addition, there may be times that cellular and WiFi networks have limited available bandwidth to provide video content to users.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
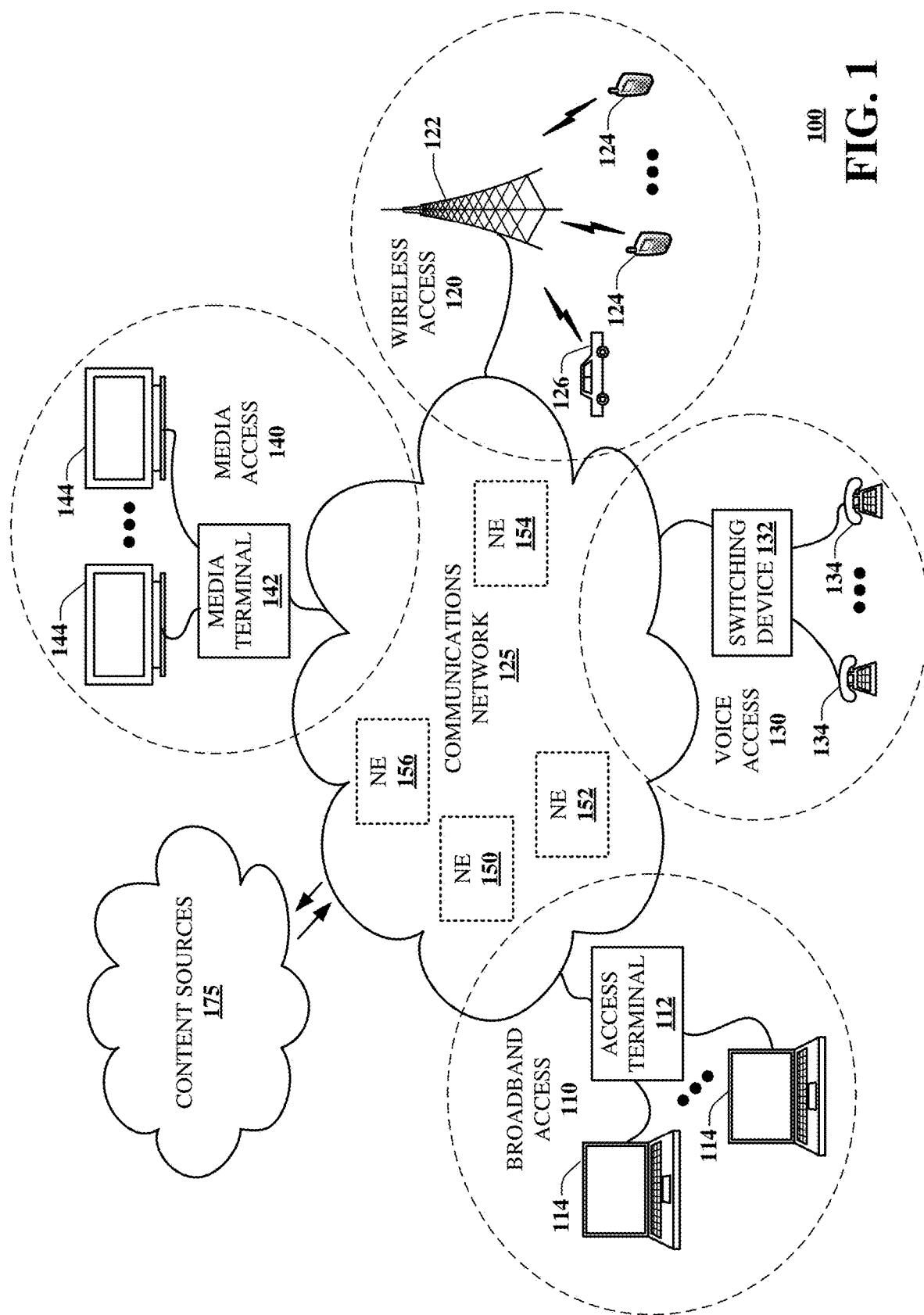
FIG. 1 is a block diagram illustrating an example, non-limiting embodiment of a communications network in accordance with various aspects described herein.

The subject disclosure describes, among other things, illustrative embodiments include identifying a first group of field of vision (FOV) tiles of video content and a first group of out of sight (OOS) tiles of the video content. The first group of FOV tiles are received from a video server over a communication network and encoded using Advanced Video Coding (AVC). The first group of OOS tiles are received from the video server over the communication network and encoded using a first layer of Scalable Video Coding (SVC). Further embodiments include providing the first group of FOV tiles and the first group of OOS tiles for presentation on a display. Additional embodiments include detecting a change in a field of vision. The change is one of an actual change in the field of vision or a predicted change in the field of vision. Also, embodiments include identifying a second group of FOV tiles of the video content. The second group of FOV tiles comprises a portion of the first group of OOS tiles. Further embodiments include requesting the portion of the first group of OOS tiles. Additional embodiments include receiving the portion of the first group of OOS tiles from the video server over the communication network. The portion of the first group of OOS tiles are encoded using an enhancement layer of SVC. Also, embodiments include providing, to the display, the portion of the first group of OOS tiles according the enhancement layer in conjunction with the providing of the first group of OOS tiles according to the first layer resulting in a high resolution version of the portion of the first group of OOS tiles. Other embodiments are described in the subject disclosure.

One or more aspects of the subject disclosure include a device comprising a processing system including a processor and a memory that stores executable instructions that, when executed by the processing system, facilitate performance of operations. The operations can include identifying a first group of field of vision (FOV) tiles of video content and a first group of out of sight (OOS) tiles of the video content. The first group of FOV tiles are received from a video server over a communication network and encoded using Advanced Video Coding (AVC). The first group of OOS tiles are received from the video server over the communication network and encoded using a first layer of Scalable Video Coding (SVC). Further operations can include providing the first group of FOV tiles and the first group of OOS tiles for presentation on a display communicatively coupled to a virtual reality headset. Additional operations can include detecting a change in a field of vision, wherein the change is one of an actual change in the field of vision or a predicted change in the field of vision. Also, operations can include identifying a second group of FOV tiles of the video content. The second group of FOV tiles comprises a portion of the first group of OOS tiles. Further operations can include identifying a version of the AVC used for the first group of FOV tiles requesting the portion of the first group of OOS tiles. Additional operations can include receiving the portion of the first group of OOS tiles from the video server over the communication network. The portion of the first group of OOS tiles are encoded using one or more enhancement layers of SVC according to the version of the AVC. Also, operations can include providing, to the display, the portion of the first group of OOS tiles according the enhancement layer in conjunction with the providing of the first group of OOS tiles according to the first layer resulting in a high resolution version of the portion of the first group of OOS tiles.

One or more aspects of the subject disclosure include a non-transitory, machine-readable medium, comprising executable instructions that, when executed by a processing system including a processor, facilitate performance of operations. The operations can include identifying a first group of field of vision (FOV) tiles of video content and a first group of out of sight (OOS) tiles of the video content. The first group of FOV tiles are received from a video server over a communication network and encoded using Advanced Video Coding (AVC). The first group of OOS tiles are received from the video server over the communication network and encoded using a first layer of Scalable Video Coding (SVC). Further operations include providing the first group of FOV tiles and the first group of OOS tiles for presentation on a display communicatively coupled to a virtual reality headset. Additional operations include detecting a change in a field of vision. The change is one of an actual change in the field of vision or a predicted change in the field of vision. Also, operations include identifying a second group of FOV tiles of the video content. The second group of FOV tiles comprises a portion of the first group of OOS tiles. Further operations include identifying a version of the AVC used for the first group of FOV tiles requesting the portion of the first group of OOS tiles. Additional operations include receiving the portion of the first group of OOS tiles from the video server over the communication network. The portion of the first group of OOS tiles are encoded using one or more enhancement layers of SVC according to the version of the AVC. Also, operations include providing, to the display, the portion of the first group of OOS tiles according the enhancement layer in conjunction with the providing of the first group of OOS tiles according to the first layer resulting in a high resolution version of the portion of the first group of OOS tiles.

One or more aspects of the subject disclosure include a method. The method can identifying, by a processing system including a processor, a first group of field of vision (FOV) tiles of video content and a first group of out of sight (OOS) tiles of the video content. The first group of FOV tiles are received from a video server over a communication network and encoded using Advanced Video Coding (AVC). The first group of OOS tiles are received from the video server over the communication network and encoded using a first layer of Scalable Video Coding (SVC) according to available bandwidth of the communication network. Further, the method can include providing, by the processing system, the first group of FOV tiles and the first group of OOS tiles for presentation on a display communicatively coupled to a virtual reality headset. In addition, the method can include detecting, by the processing system, a change in a field of vision. The change is detected using machine learning techniques. Also, the method can include identifying, by the processing system, a second group of FOV tiles of the video content, wherein the second group of FOV tiles comprises a portion of the first group of OOS tiles. Further, the method can include receiving, by the processing system, the portion of the first group of OOS tiles from the video server over the communication network. The portion of the first group of OOS tiles are encoded using an enhancement layer of SVC. In addition, the method can include providing, by the processing system, to the display, the portion of the first group of OOS tiles according the enhancement layer in conjunction with the providing of the first group of OOS tiles according to the first layer resulting in a high resolution version of the portion of the first group of OOS tiles.

The pending patent application incorporates by reference the article. "360 degree innovations for Panoramic Video Streaming," 16$^{th}$ ACM Workshop on Hot Topics in Networks.

Referring now to FIG. 1, a block diagram is shown illustrating an example, non-limiting embodiment of a communications network 100 in accordance with various aspects described herein. Embodiments include providing FOV tiles and OOS tiles encoded using AVC and a first layer of SVC, respectively, from a video server over a communication network 100 to a video player to be presented on a display. Further, in response to identifying a change in field of vision, the video server can provide over the communication network 100 a portion of the OOS tiles encoded using an enhancement layer of SVC to the video player to be presented on the display.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
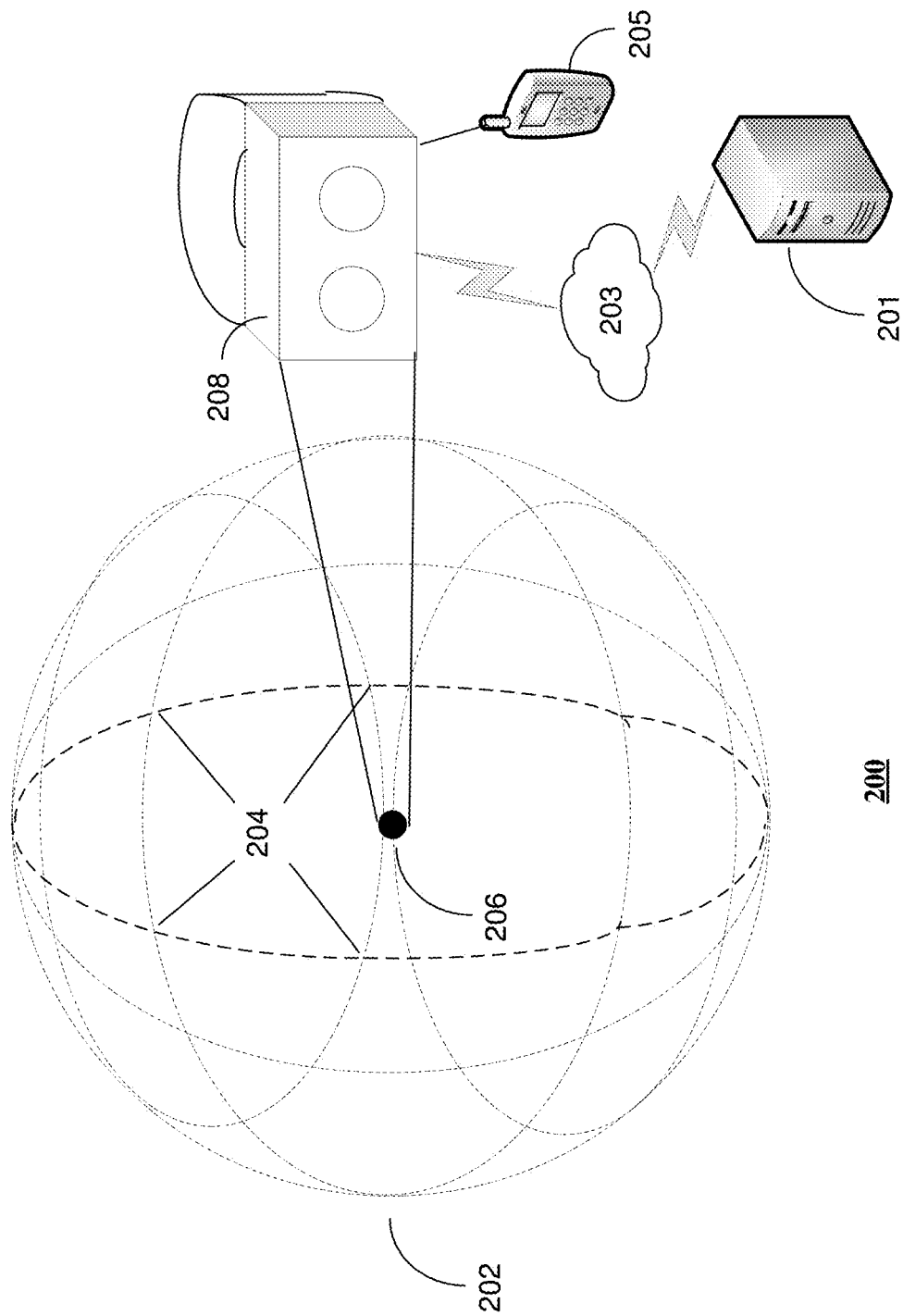
FIGS. 2A-F are block diagrams illustrating example, non-limiting embodiments of a system functioning within the communication network of FIG. 1 in accordance with various aspects described herein.

FIGS. 2A-F are block diagrams illustrating example, non-limiting embodiments of a system 200 functioning within the communication network of FIG. 1 in accordance with various aspects described herein. Referring to FIG. 2A, in one or more embodiments, a system 200 can include a video server 201 that provides video content over communication network 203 to a media device 205 communicatively coupled to a virtual reality headset 208. In some embodiments, the video content can be 360 degree video content that can be viewed or presented using the virtual reality headset 208. In further embodiments, a media device 205, such as a smartphone, can be coupled to the virtual reality headset 208 to view the 360 video content. In other embodiments, the video content can be provide by the video server 201 over the communication network to a media device communicatively coupled to a display to present the video content. In additional embodiments, the video server can be a media content server, a social media server, a gaming server, web server, or any other server that provides video content. In further embodiments, the media device can be a mobile device (e.g. smartphone, tablet computer, laptop computer, etc.) or any other media device (e.g. television, desktop computer, set top box, media processor, etc.).

In one or more embodiments, 360 degree video content viewed on the display of the virtual reality headset 208 can be presented from the perspective of being at a center 206 of a sphere 202. A user wearing the virtual reality headset 208 can view different perspectives of the 360 video content by moving the user's head in a particular direction. For example, if a user moves her head up, then the video content is adjusted to provide the perspective toward the top of the sphere 202.

In one or more embodiments, the video content is provided by the video server 201 into chunks or portions of video content. Further, each chunk can be segmented into tiles 204 and provided or transmitted by the video server 201. The tiles can be received by a video player that is integrated with or communicatively coupled with the virtual reality headset or any display communicatively and/or physically coupled to the media device 205. In some embodiments, the tiles of the video content are provided by the video server 201 at a high quality to present high quality video content on the virtual reality headset. However, high quality tiles of the video content consumes a high amount of bandwidth over the communication network 203. In some embodiments, the communication network 203 may be a cellular network or a WiFi network with limited available bandwidth to provide video content, particularly 360 degree video content. Either the video player of the media device (e.g. virtual reality headset 208) or the video server 201 can detect the available bandwidth of the communication network 203. If the available bandwidth is higher than a predetermined threshold, the video server can provide high quality tiles (e.g. AVC) to the video player. However, if the available bandwidth is lower than the predetermined threshold, then the video server can provide a portion of the tiles at a high quality (e.g. encoded using AVC) and another portion of the tiles at a lower quality (e.g. encoded using SVC). In some embodiments, the available bandwidth is at such a level that all the tiles may be provided at a lower quality (e.g. encoded using SVC).

Figure 2B:
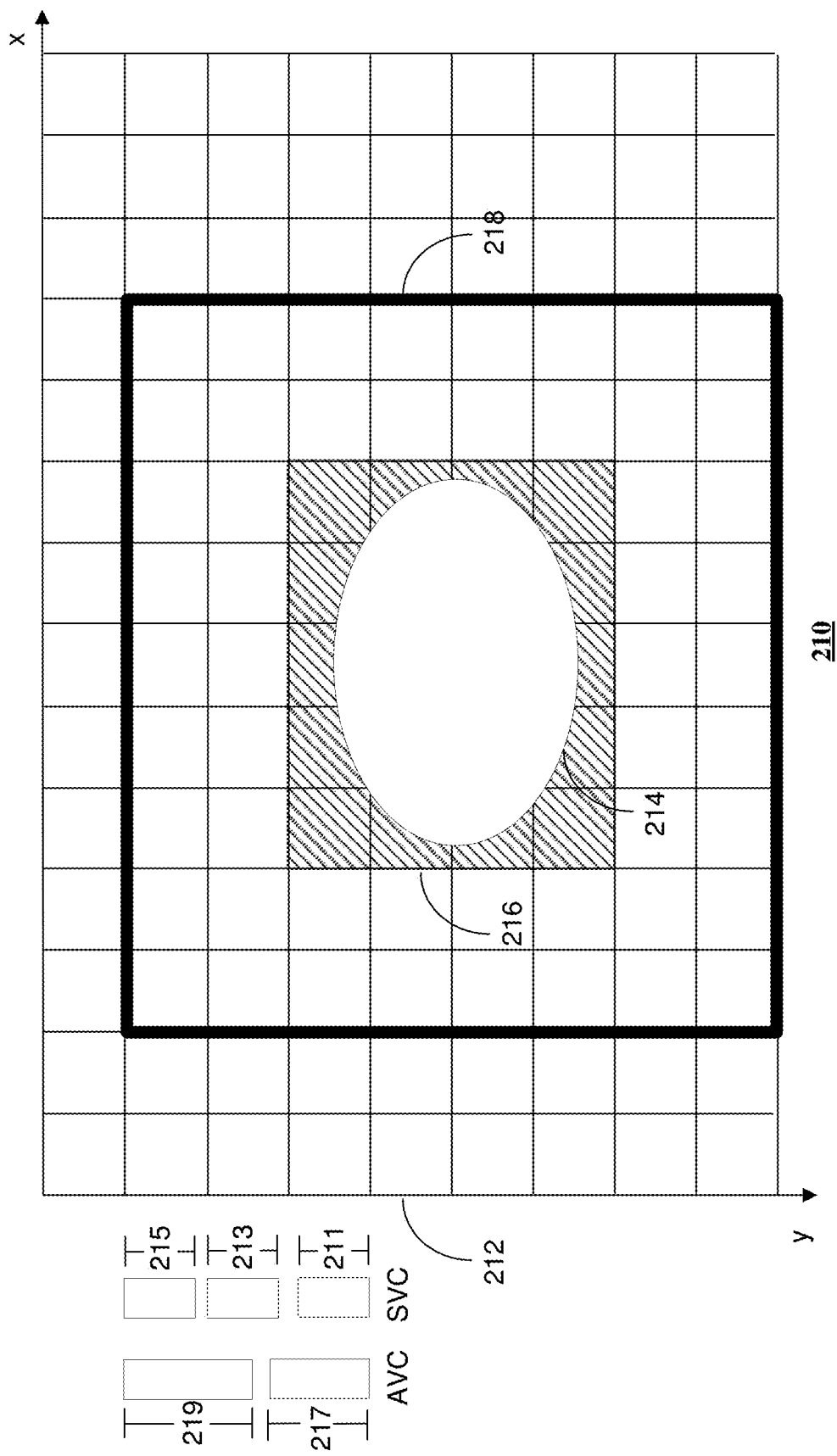

Referring to FIG. 2B, one or more embodiments of system 210, a portion of the tiles of the video content, within a first time period of playback of the video content, can be identified as FOV tiles 216 and another portion of the tiles 218 can be identified as OOS tiles. Tiles for a chunk or portion of 360 degree video content corresponding to a three dimensional perspective can be organized into a two dimensional array 212. The video player can identify the FOV 214 of the user for a particular chunk or portion of video content at a particular time.

In one or more embodiments, the FOV tiles 216 can be identified during playback of the video content on the display of a virtual reality headset. The identified FOV tiles 216 can be requested by the video player from the video server 201 over the communication network 203. In some embodiments, the video player can indicate that the requested FOV tiles should be of high quality, processed using AVC, for example. Further, the identified OOS tiles 218 can be requested by the video player from the video server 201 over the communication network 203. The video player can indicate that the requested OOS tiles should be of a lower quality, processed using SVC, for example (in response to determining the communication network has limited available bandwidth). Not only is SVC used to encode OOS tiles due to limited bandwidth, in some embodiments, a portion or all of the OOS tiles may not be viewed by a user/viewer. Thus, sending the OOS tiles using AVC or at a higher quality than SVC may waste bandwidth. In other embodiments, the video server can determine the communication network has limited available bandwidth. In further embodiments, the video server 201 can then transmit the FOV tiles to the video player using AVC and transmit the OOS tiles to the video player using SVC.

In one or more embodiments, AVC can provide each tile in different versions 217, 219, each version 217, 219 a different quality. AVC Version 1 217 can be a lower quality than AVC Version 2 219. SVC can also provide each tile in different versions 211, 213, 215, each version 211, 213, 215 a different quality. SVC layer 1 211 can be a lower quality than SVC layer 2 213. Further, SVC layer 1 211 and SVC layer 2 213 can both be of lower quality than SVC layer 3. In addition, the quality of SVC layer 1 213 can be lower than AVC Version 1 217. However, the addition of a tile coded by SVC layer 1 213 and coded by SVC layer 2 results in a tile of similar quality of AVC Version 1 217. Also, the addition of a tile coded by SVC layer 1 211, coded by SVC layer 2 213, and coded by SVC layer 3 215 results in a tile of similar quality of AVC Version 2 219. The lower quality of the tile, the less bandwidth it consumes when transmitted over communication network 203. Thus, to conserve bandwidth of communication network 203, FOV tiles can be coded using AVC and OOS can be coded using SVC then transmitted by the video server 201 to the video player over the communication network 203. In further embodiments, the quality of OOS tiles can be increased by presenting OOS tiles encoded as a first layer of SVC 211 in conjunction with OOS tiles encoded as an enhanced layer of SVC 213.

Note, in some embodiments, the video content may be less than 360 degree video content. Further, in other embodiments, the video content that may be less than 360 degree video content can be panoramic video content. In addition, embodiments can be video content or any media content.

Figure 2C:
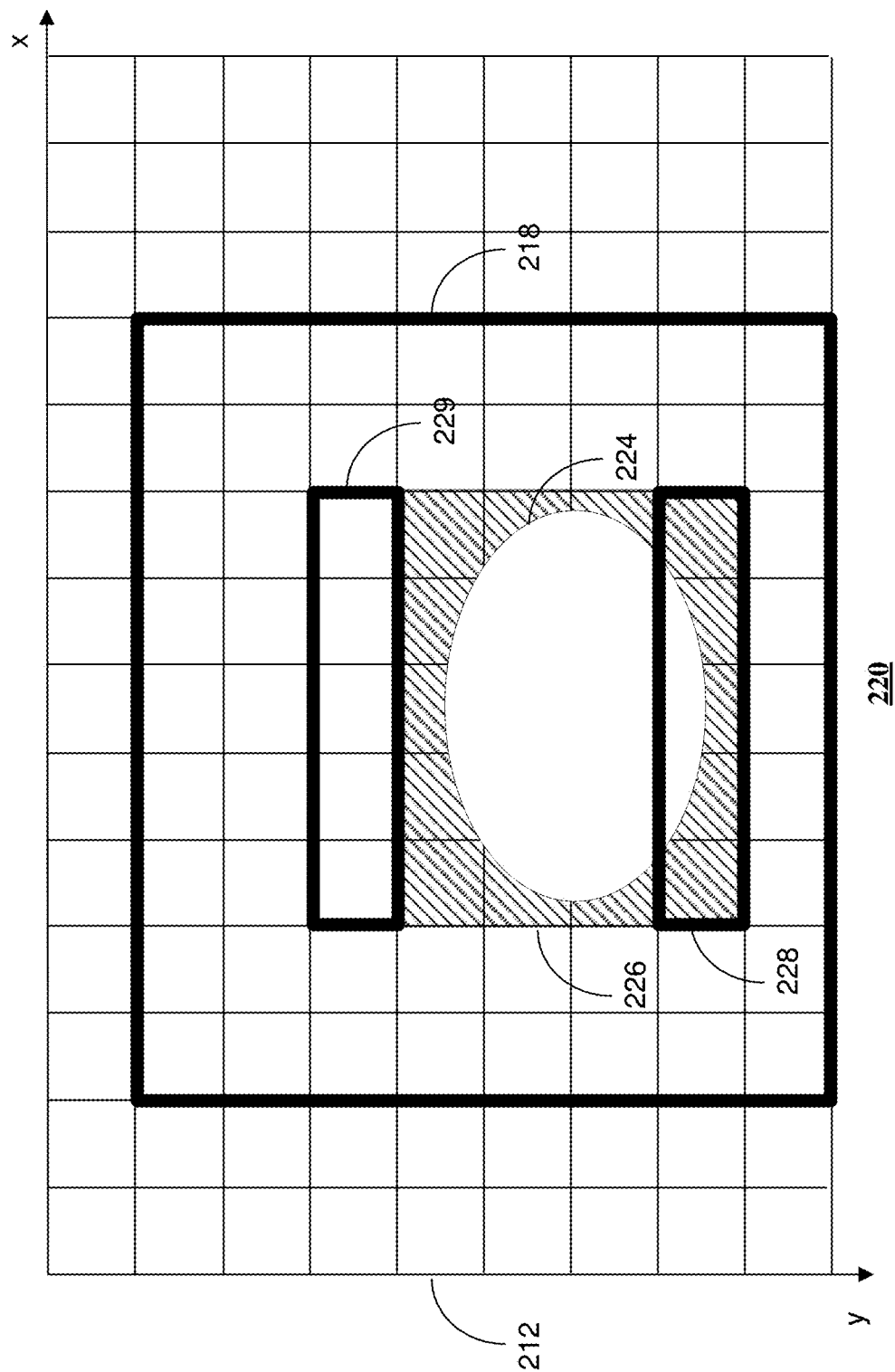

Referring to FIG. 2C, in one or more embodiments of system 220, in one or more embodiments, during a next time period of the video content playback (i.e. presentation), a next FOV 224 is identified. The next FOV 224 can be identified using prediction methods such as machine learning or analyzing historical viewership of the video content at the same time period. For example, the video content can be the 360 degree video of travelling down a roller coaster. It can be determined by machine learning or analyzing historical viewership that most users FOV will be lower than the previous FOV 214 (e.g. detect a change in FOV). In another example, it can be determined by detecting the head movements of a user wearing a virtual reality headset a change in FOV. The next FOV corresponds to a next group of FOV tiles 226. Fifteen of the tiles from the previous group of FOV tiles 216 are included in the next group of FOV tiles 226. Five tiles 229 from the previous group of FOV tiles 216 are not needed for the next group of FOV tiles 226. Thus, the video player can request higher quality tiles for the bottom row of the next group of FOV tiles 228 that were previously OOS tiles 218. In response to the request, video server 201 can provide the higher quality tiles 228. In some embodiments, the higher quality tiles 228 can be provided using AVC. This may be done if there is enough available bandwidth over the communication network (e.g. available bandwidth is above a predetermined threshold detected by the video player or the video server). In other embodiments, the higher quality tiles 228 can be provided using an enhancement layer of SVC. This can be done when there is not enough available bandwidth over the communication network (e.g. available bandwidth is below a predetermined threshold detected by the video player or the video server). For example, the previous OOS tiles may have been provided with layer 1 SVC. The higher quality tiles 228 can be provided by the video server 201 using layer 2 SVC (i.e. layer 2 is the enhancement layer). The lower quality OOS tiles 228 can be presented in conjunction with the higher quality OOS tiles 228. Note, in other embodiments, the video player has already received the OOS tiles using a base layer of SVC (e.g. layer 1). In such embodiments, the OOS tiles would be received using an enhanced layer of SVC so as not to waste network bandwidth by resending the OOS tiles using AVC, which would consume more bandwidth, as discussed herein.

Figure 2D:
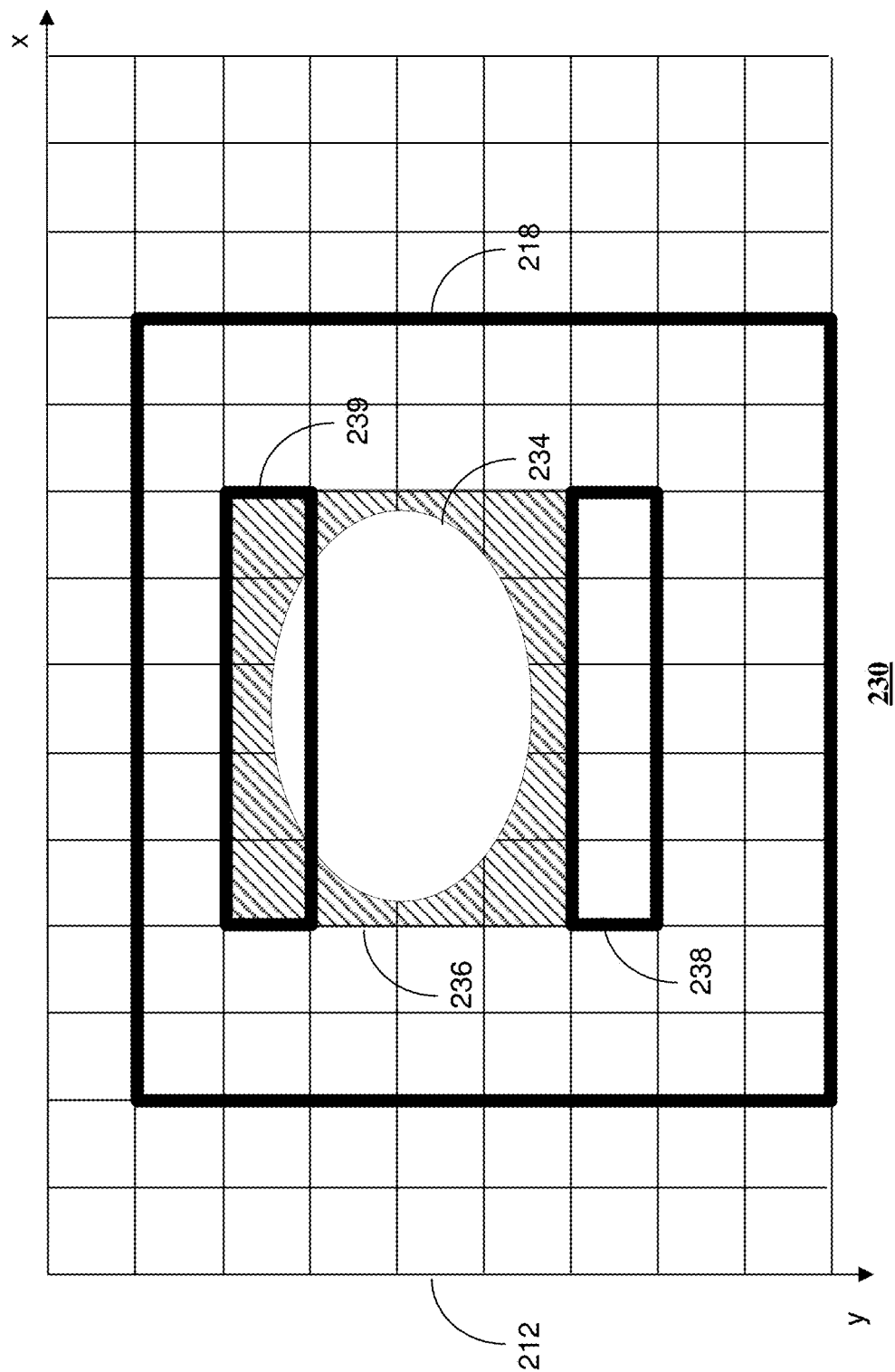

Referring to FIG. 2D, in one or more embodiments of system 230, the actual FOV 234 for the next time period, during the video content presentation, can be different than the predicted FOV 226. Instead of the user lowering her FOV as in the predicted FOV 226, the user may raise her FOV 236. Thus, OOS tiles 239 are presented on the display at a lower quality the other FOV tiles 236. Further, the video player can request higher quality tiles for the OOS tiles 239. In response to the request, the video server 201 can provide the higher quality tiles 228. In some embodiments, the higher quality tiles 239 can be provided using an enhancement layer of SVC. This can be done when there is not enough available bandwidth over the communication network (e.g. available bandwidth is below a predetermined threshold detected by the video player or the video server). For example, the previous OOS tiles may have been provided with layer 1 SVC. The higher quality tiles 239 can be provided by the video server 201 using layer 2 SVC (i.e. layer 2 is the enhancement layer). Tiles 238 are no longer in the FOV 236 and are not presented on the display.

Figure 2E:
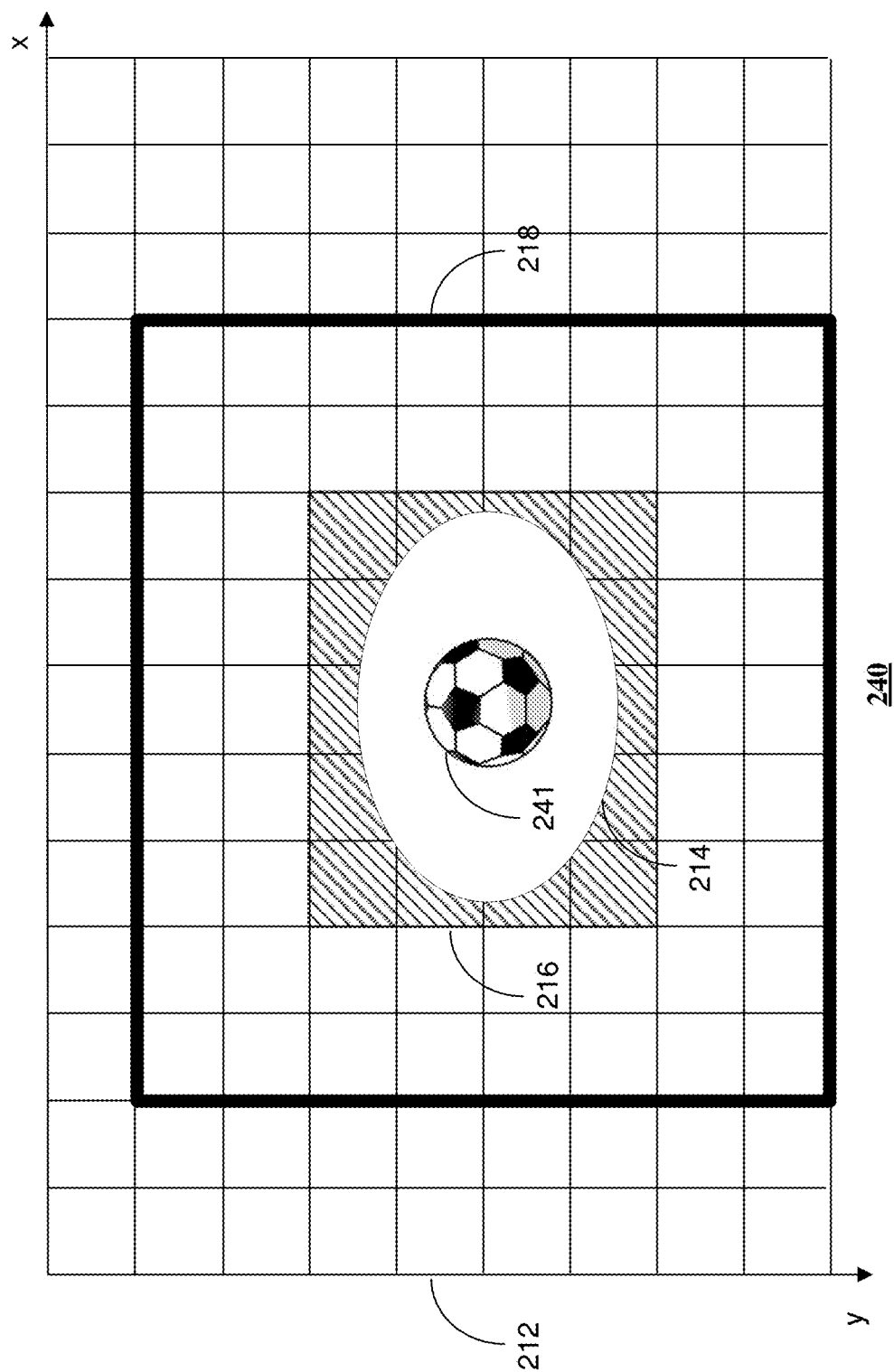

Referring to FIG. 2E, in one or more embodiments of system 240, the video content can be for a video content with a focus object 241. For example, the video content can be of a soccer game and the focus object 241 can be the soccer ball. In such video content, in most situations, the FOV 214 for the user follows the focus object 241. Thus, the FOV tiles 216 can surround the focus object and the OOS tiles 218 are beyond the FOV tiles surrounding he focus object 241.

Figure 2F:
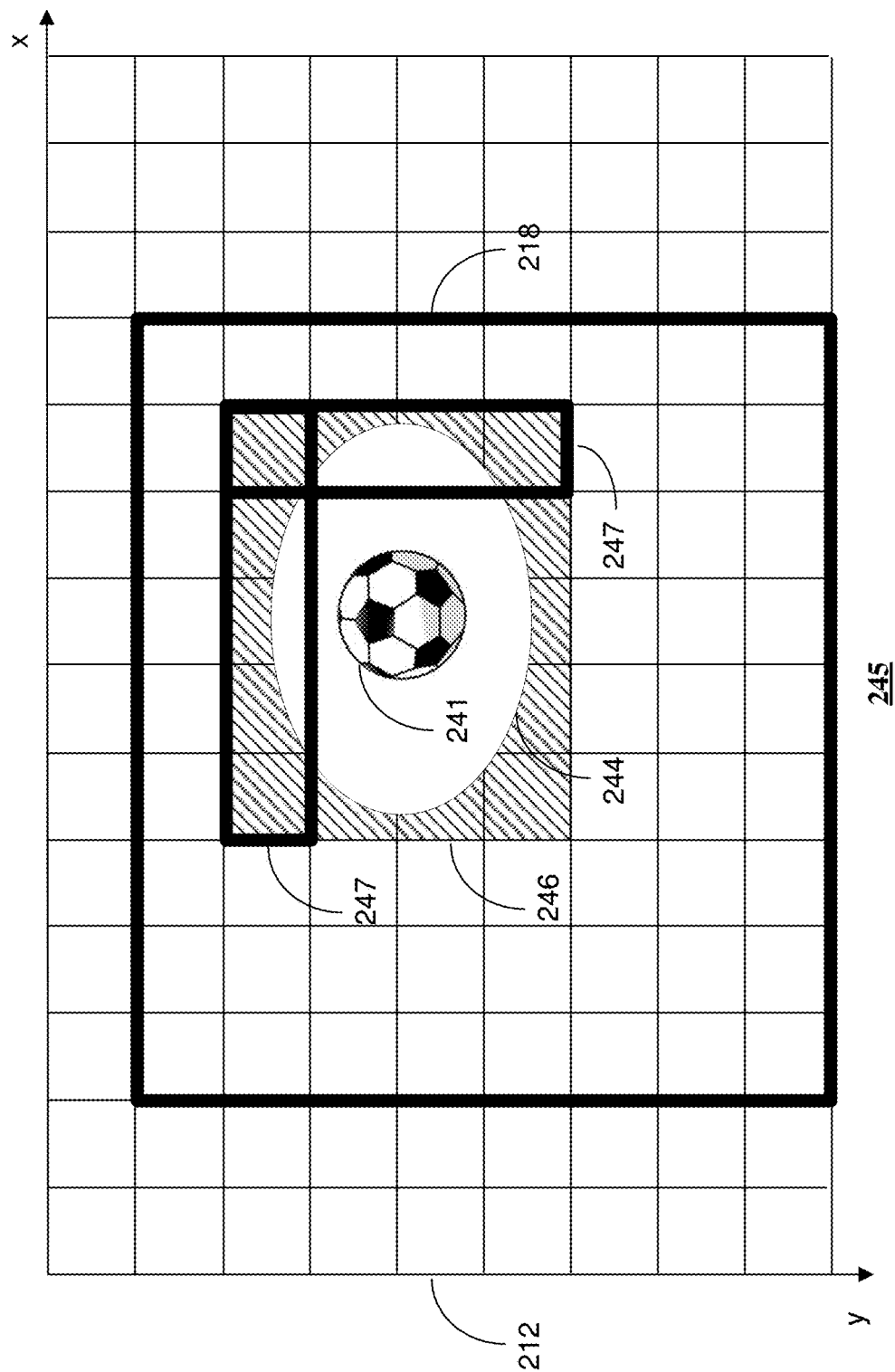

Referring to FIG. 2F, in one or more embodiments of system 245, the next FOV 244 can be predicted according to the tracking of the focus object 241. For example, the soccer ball can be tracked to move to a higher and toward the right of the previous FOV 214. Thus, the next FOV tiles include twelve FOV tiles of the previous FOV tiles 216 and eight tiles 247 that were previously OOS tiles. Thus, OOS tiles 247 are presented on the display at a lower quality the other FOV tiles 246. Further, the video player can request higher quality tiles for the OOS tiles 247. In response to the request, the video server 201 can provide the higher quality tiles 247. In some embodiments, the higher quality tiles 247 can be provided using an enhancement layer of SVC. This can be done when there is not enough available bandwidth over the communication network (e.g. available bandwidth is below a predetermined threshold detected by the video player or the video server). For example, the previous OOS tiles may have been provided with layer 1 SVC. The higher quality tiles 247 can be provided by the video server 201 using layer 2 SVC (i.e. layer 2 is the enhancement layer).

Figure 2G:
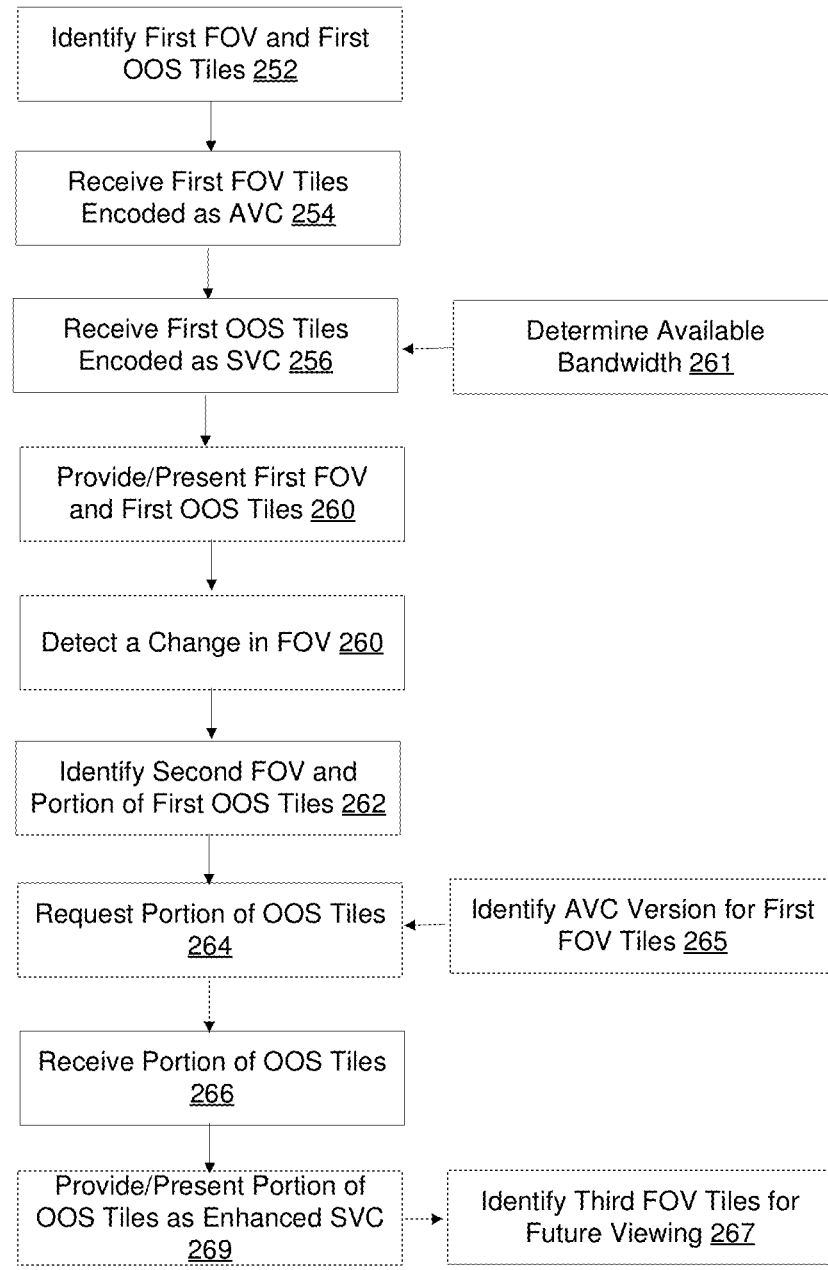
FIGS. 2G-2I depict illustrative embodiments of methods in accordance with various aspects described herein.
Figure 2H:
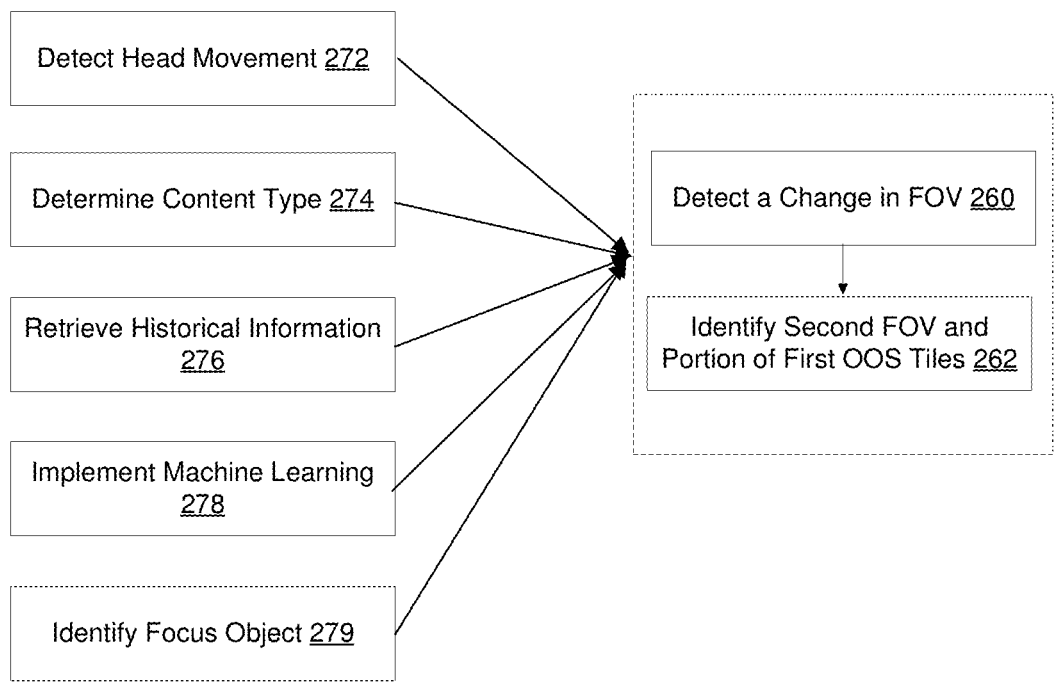
Figure 2I:
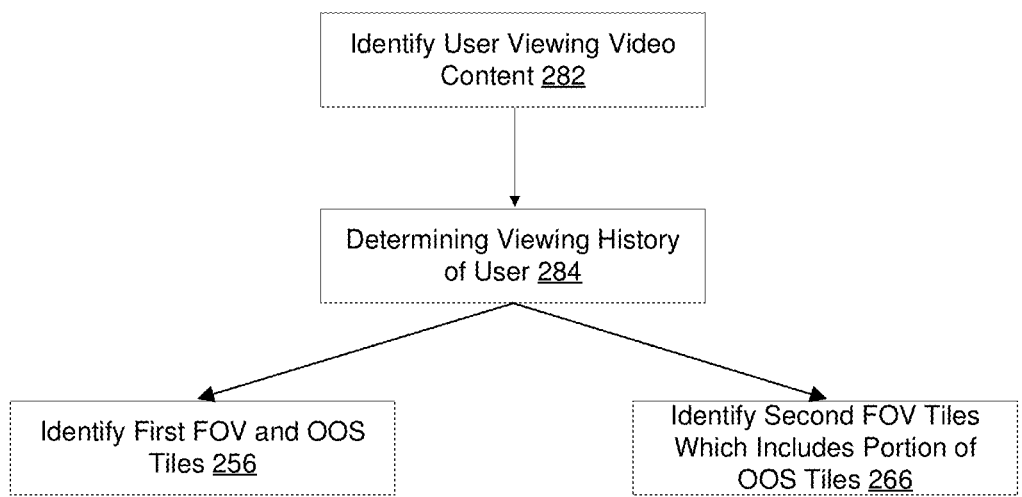

FIGS. 2G-2I depicts an illustrative embodiments of methods 250, 270, 280 in accordance with various aspects described herein. Referring to FIG. 2G, in one or more embodiments, method 250 can be implemented by a video player, media processor, or a video server. The video player can be a software application integrated into a media device such as a virtual reality headset or smartphone.

In one or more embodiments, the method 250 can include, at 252, the video player identifying a first group of FOV tiles of video content and a first group of OOS tiles of the video content. Further, the method 250 includes, at 254, the video player receiving the first group of FOV tiles from a video server over a communication network encoded using AVC. In addition, the method 250 includes, at 256, the video player receiving the first group of OOS tiles from a video server over a communication network encoded using SVC. Also, the method 250 include, at 260, the video player providing the first group of FOV tiles and the first group of OOS tiles for presentation on a display. Further, the method 250 can include, at 260, the video player detecting a change in a field of vision. The change is one of an actual change in the field of vision or a predicted change in the field of vision. In addition, the method 250 can include, at 262, the video player identifying a second group of FOV tiles of the video content. The second group of FOV tiles comprises a portion of the first group of OOS tiles. Also, the method 250 can include, at 264, the video player requesting the portion of the first group of OOS tiles. Further, the method 250 can include, at 266, receiving the portion of the first group of OOS tiles from the video server over the communication network. The portion of the first group of OOS tiles are encoded using an enhancement layer of SVC. In addition, the method 250 can include, at 269, the video player providing, to the display, the portion of the first group of OOS tiles according the enhancement layer in conjunction with the providing of the first group of OOS tiles according to the first layer resulting in a high resolution version of the portion of the first group of OOS tiles.

In one or more embodiments, the method 250 can include, at 261, the video player determining the available bandwidth of the communication network and indicate the available bandwidth to the video server, which in response, encodes the first OOS tiles using the first layer of SVC according to available bandwidth of the communication network. In other embodiments, the video server can determine the available bandwidth of the communication network and encodes the first OOS tiles using the first layer of SVC according to available bandwidth of the communication network. Further, the available bandwidth is used to determine the quality of FOV tiles encoded as AVC (e.g. AVC version 1, AVC version 2, etc.) and how many OOS tiles to fetch, request, provide, etc.

In one or more embodiments, the method 250 can include, at 265, the video player identifying a version of the AVC used for the first group of FOV tiles. Further, the requesting the portion of the first group of OOS tiles comprises requesting one or more enhancement layers of SVC for the portion of the first group of OOS tiles according to the version of the AVC used for the first group of FOV tiles from the video server. In addition, the receiving of the portion of the first group of OOS tiles comprises receiving the portion of the first group of OOS tiles from the video server over the communication network. The portion of the first group of tiles are encoded according to the one of more enhancements layers of SVC.

In one or more embodiments, the method 250 can include, at 267, the video player identifying a third group of FOV tiles of the video content for a future viewing of the video content. The third group of FOV tiles comprises the portion of the first group of OOS tiles.

In one or more embodiments, the video content can comprise 360 degree video content and the display can be communicatively coupled to a virtual reality headset.

Referring to FIG. 2H, in one or more embodiments, method 270 can be implemented by a video player, media processor, or a video server. The video player can be a software application integrated into a media device such as a virtual reality headset or smartphone. The method 270 can include, at 272, the video player detecting the change in a field of vision comprises detecting a head movement of a user viewing the first group of FOV tiles and the identifying the second group of FOV tiles comprises identifying the second group of FOV tiles according to the head movement of the user viewing the first group of FOV tiles.

In one or more embodiments, the method 270 can include, at 274, the video player detecting the change in a field of vision comprises determining a content type of the video content, and the identifying the second group of FOV tiles comprises identifying the second group of FOV tiles according to the content type.

In one or more embodiments, the method 270 can include, at 276, the video player the identifying of the second group of FOV tiles comprises retrieving historical information regarding a head movement of each of a plurality of users viewing the video content and identifying the second group of FOV tiles according to the historical information.

In one or more embodiments, the method 270 can include, at 278, the video player detecting the change in a field of vision comprises implementing machine learning techniques on viewing reaction of each of a plurality of users viewing the video content, and the identifying the second group of FOV tiles comprises identifying the second group of FOV tiles according to the machine learning techniques.

In one or more embodiments, the method 270 can include, at 279, the video player identifying of the second group of FOV tiles comprises identifying a focus object within the video content and identifying the second group of FOV tiles according to the focus object.

Referring to FIG. 2I, in one or more embodiments, method 280 can be implemented by a video player, media processor, or a video server. The video player can be a software application integrated into a media device such as a virtual reality headset or smartphone. The method 280 can include, at 282, the video player identifying a user viewing the video content and, at 284, determining a viewing history of the user. Further, the method 280 can include, at 256, the identifying first group of FOV tiles and first group of OOS tiles comprises identifying the first group of FOV tiles and the first group of OOS tiles according to the viewing history of the user, and at 266, the identifying of the second group of FOV tiles comprises identifying the second group of FOV according to the viewing history of the user. In some embodiments, the viewing history of the user comprises a recording of head movements of the user while wearing a virtual reality headset and viewing similar video content to the video content.

In one or more embodiments, the video content can be provided by a social media server instead of a video content server.

While for purposes of simplicity of explanation, the respective processes are shown and described as a series of blocks in FIGS. 2G-2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, portions of some embodiments described herein can be combined or separate from the portions of the same or other embodiments.

In one or more embodiments, 360-degree videos are becoming increasingly popular on commercial platforms. Embodiments described herein aim at improving the performance, resource utilization efficiency, and users' quality of experience (QoE) for 360° video streaming on commodity mobile devices. Based on a Field-of-View (FoV) guided approach that fetches only portions of a scene that users see, embodiments described herein include robust video rate adaptation with incremental chunk upgrading. Embodiments demonstrate performance of 360° video streaming system.

The predominance of video streaming in today's Internet shows no sign of weakening. In Q4 2016, mobile videos have eventually surpassed desktop videos in terms of online viewing time. Today's mobile videos are escalating in many dimensions including resolution, frame rate, codec, and in particular, the interaction method (e.g., 360° video and drone-assisted video). Such changes are fueled by multiple factors including faster mobile networks (LTE and 5G), new video types, more powerful devices, and affordable gear or accessories such as Virtual Reality (VR) headsets. Embodiments described herein explore several research directions for streaming 360° videos, also known as immersive or panoramic videos. 360° videos are expected to become 'the next frontier in mobile video." As a component of VR, they provide users with an immersive viewing experience that far exceeds what regular videos can offer. They are becoming increasingly popular on commercial platforms such as You-Tube with the top videos being viewed more than 60 million times.

Maintaining good Quality of Experience (QoE) for 360° videos over bandwidth-limited links on commodity mobile devices remains challenging. First, 360° videos are large: under the same perceived quality, 360° videos have around 5× larger sizes than conventional videos. Second, 360° videos are complex: sophisticated projection and content representation schemes may incur high overhead. For example, the projection algorithm used by Oculus 360 VR headset requires servers to maintain up to 88 versions of the same video. Third, 360° videos are still under-explored: there is a lack of real-world experimental studies of key aspects such as rate adaptation, QoE metrics, and cross-layer interactions (e.g., with TCP and web protocols such as HTTP/2). Embodiments described herein include building blocks of next-generation 360° video systems that include FOV guided approach that fetches only portions of a scene users will see. A pinpointing of a fundamental mismatch between today's popular encoding schemes (e.g., H.264/AVC and H.265/HEVC) and FOV guided 360° streaming: these schemes lack the capability of incrementally upgrading a fetched portion to a higher quality. Embodiments can include a rate adaptation scheme with a "delta encoding" design that can substantially improve the adaptiveness in face of FOV prediction errors.

Big data analytics to facilitate accurate head movement prediction (HMP), a key prerequisite for FOV-guided streaming. Specifically, jointly consider several dimensions including (1) viewing statistics of the same video across users, (2) viewing behaviors over multiple videos of a single user, and (3) other contextual information such as users" poses and engagement levels. Such a "data fusion" approach provides intelligence for FOV-guided prefetching.

Figure 2J:
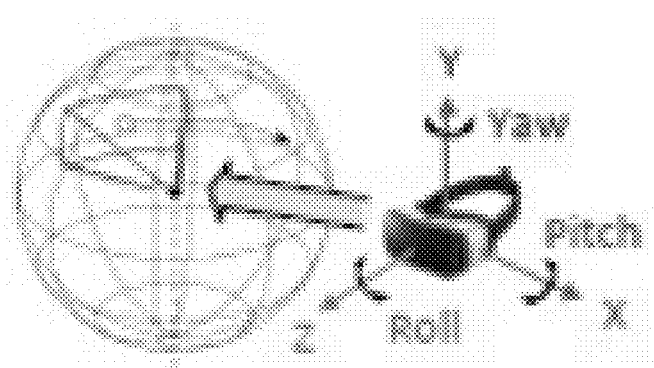
FIGS. 2J-2K depict embodiments of systems for adapting the rate of video content streaming.

360° videos are recorded by omnidirectional cameras, which capture all 360 degrees of a scene that can be "wrapped" onto a 3D sphere. There are COTS portable omnidirectional cameras that are either standalone (e.g., Acer Holo 360° with built-in LTE) or attachable to a smartphone (e.g., Insta360). Users can watch 360° videos directly on commodity smartphones or through affordable VR devices such as a Google Cardboard. When watching a 360° video, a viewer at the center of the sphere can freely control her viewing direction by changing the pitch, yaw, and roll as shown in FIG. 2J. During a playback, in addition to performing regular video decoding, the player also needs to apply projection to render the content in the user's current FoV based on her head orientation. There are different projection algorithms such as equirectangular projection used by YouTube and Cube Map employed by Facebook. The width and height of the FoV are usually fixed parameters of a VR headset.

Today's major 360° video providers (e.g., YouTube and Facebook) employ FoV-agnostic streaming that delivers the entire panoramic view, leading to possible inefficient use of bandwidth. To play HD 360° videos smoothly over networks with limited bandwidth, FoV-guided streaming can be employed that focuses on providing high quality views within users' FoV. Described herein are two FoV-guided approaches: tiling and versioning.

Tiling can be described as follows. The 360° video is spatially segmented into tiles. Only tiles within the FoV are downloaded at high quality, whereas the remaining tiles are delivered at lower qualities or not delivered at all. It can be demonstrated via trace-driven simulations that tiling provides significant bandwidth saving (typically 45% and 60% to 80%) compared to the FoV-agnostic approach. Tiling imposes reduced load at the server while increasing the load at the client, which needs to determine the group of tiles to fetch and then stitch them together. As described herein, this approach is feasible on COTS smartphones.

The 360° video is encoded into multiple versions each having a different high-quality region; the (video) player needs to pick the appropriate version based on user's viewing direction. This approach simplifies the fetching, decoding, and rendering logic at the client's (video) player, but incurs substantial overhead at the server that needs to maintain a large number of versions of the same video (e.g., up to 88 for Oculus 360).

In the multimedia community, panoramic video generation can be from either a single camera or multiple cameras. Researchers also proposed different projection and encoding schemes. Some embodiments can include other aspects such as measurement, energy consumption, and optimization through edge computation. It is worth mentioning that the vast majority of recent mobile 360° video research is based on simulation or trace-driven emulation. Some embodiments can include a proprietary system implementation that is in early-stage, e.g., lacking components such as rate adaptation and head movement prediction. This is in sharp contrast with conventional video streaming research where many mature and open-source players and tools are available.

Figure 2K:
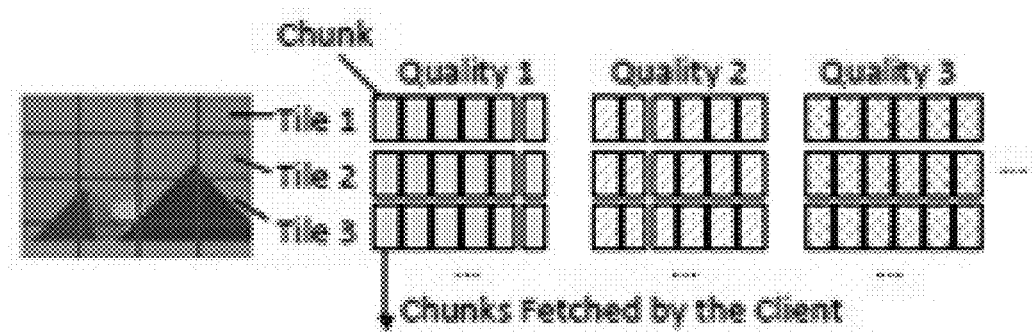

Embodiments can include developing Sperke, a FoV-guided adaptive mobile 360° video streaming framework. Sperke employs a tiling-based approach to avoid storing too many video versions at the server side. Sperke has three goals: (1) smooth playback based on robust head movement prediction (HMP), (2) interchangeable projection, rate adaptation, and HMP algorithms as the ones described herein, and (3) compatibility with COTS devices. As shown in FIG. 2K, Sperke follows the DASH paradigm and encodes a panoramic video into multiple qualities; each quality is spatially segmented into multiple tiles, which are then temporally split into chunks. A chunk C(q, 1, t) is thus the smallest downloadable unit in Sperke where q, 1, and t are the quality level, tile ID, and chunk starting time, respectively. All chunks have the same duration (e.g., one or two seconds), and are fetched by the client's (video) player based on estimated network conditions and HMP. Chunks are then decoded, projected, and rendered according to user's current FoV.

Sperke can be an "infrastructural base" upon which embodiments herein can be built and evaluated. Embodiments include several salient features and optimizations to the Sperke framework to improve its performance, resource efficiency and usability.

Embodiments can include video rate adaptation with incremental chunk upgrades that also include incremental chunk upgrading support. Today's 360° and non-360° videos share the same set of encoding schemes such as H.264/AVC, H.265/HEVC, VP9, etc. An observation that there is a fundamental mismatch between them and FoV-guided streaming due to HMP's imperfection. To see the reason, assume that the HMP algorithm predicts that the user will look at FoV X. Due to the possibly change again in the near future, while upgrading too late may miss the playback deadline. Embodiments can include integration of the above three parts into a holistic 360° VRA algorithm. Note that our proposed scheme can be further extended to support a hybrid SVC/AVC scheme: the server prepares both the SVC and AVC versions of a 360° video; for chunks whose qualities are not likely to upgrade, it can directly fetch their AVC versions to avoid the (reasonable yet not negligible) performance/bandwidth overhead of SVC.

Referring now to FIG. 3, a block diagram 300 is shown illustrating an example, non-limiting embodiment of a virtualized communication network in accordance with various aspects described herein. Embodiments include providing FOV tiles and OOS tiles encoded using AVC and a first layer of SVC, respectively, from a video server over a communication network (e.g. virtualized communication network) to a video player to be presented on a display. Further, in response to identifying a change in field of vision, the video server can provide over the communication network a portion of the OOS tiles encoded using an enhancement layer of SVC to the video player to be presented on the display.

In particular a virtualized communication network is presented that can be used to implement some or all of the subsystems and functions of communication network 100, the subsystems and functions of systems and methods described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
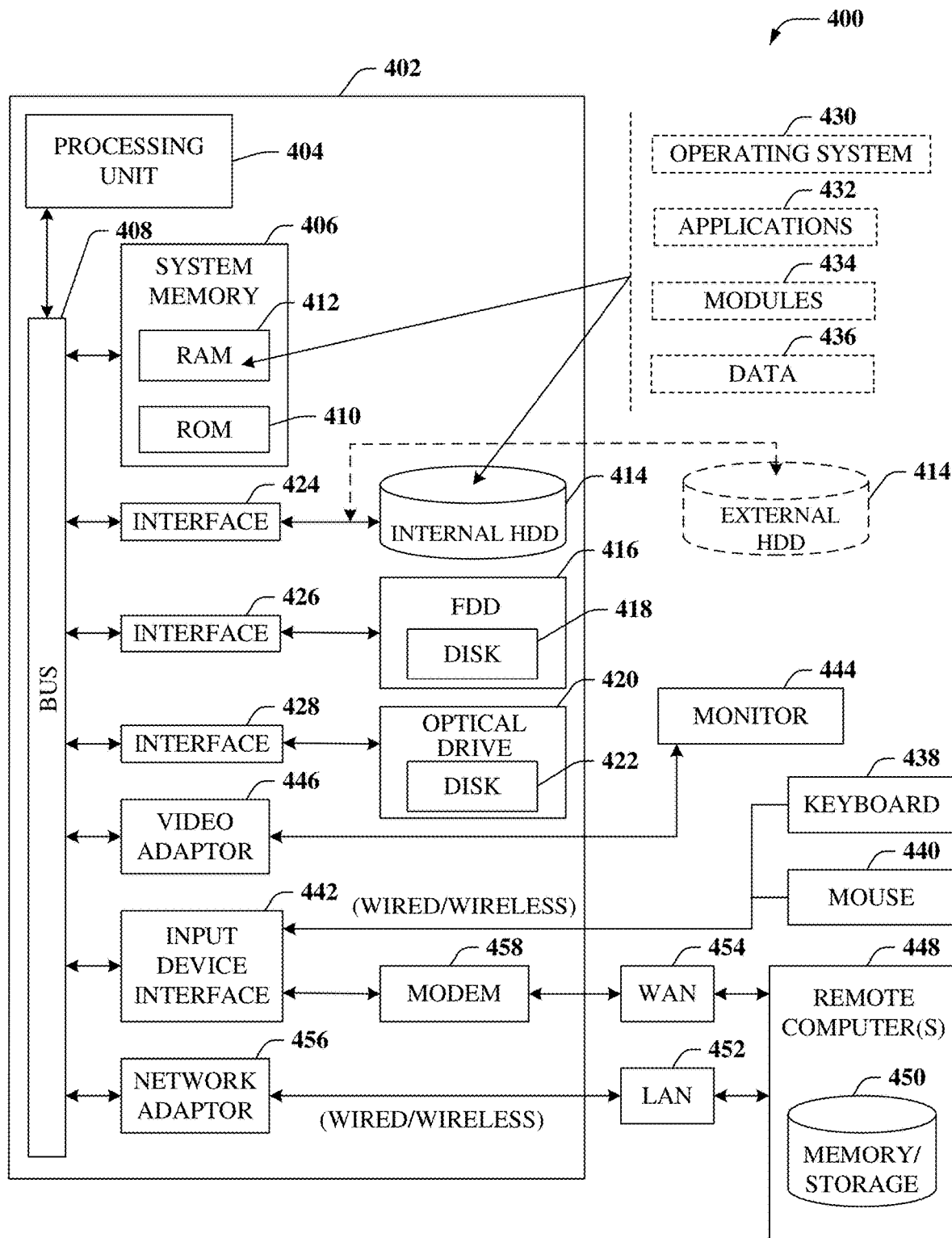
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404. The computer 402 can be a computing device integrated into the video server, mobile device/media device with video player, and virtual reality headset, described herein.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
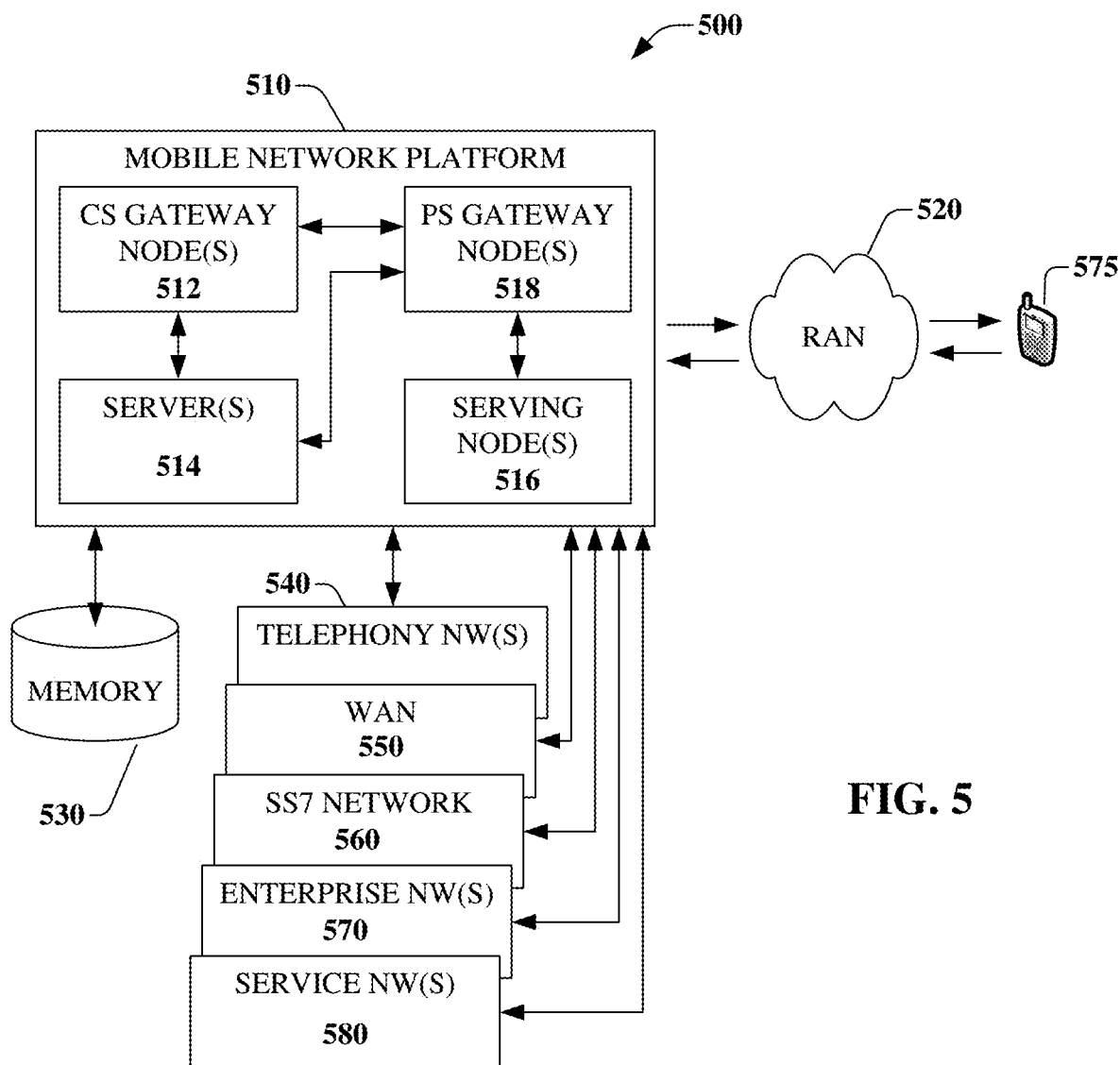
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. Embodiments include providing FOV tiles and OOS tiles encoded using AVC and a first layer of SVC, respectively, from a video server over a communication network (e.g. mobile network platform) to a video player to be presented on a display. Further, in response to identifying a change in field of vision, the video server can provide over the communication network a portion of the OOS tiles encoded using an enhancement layer of SVC to the video player to be presented on the display.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) of radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
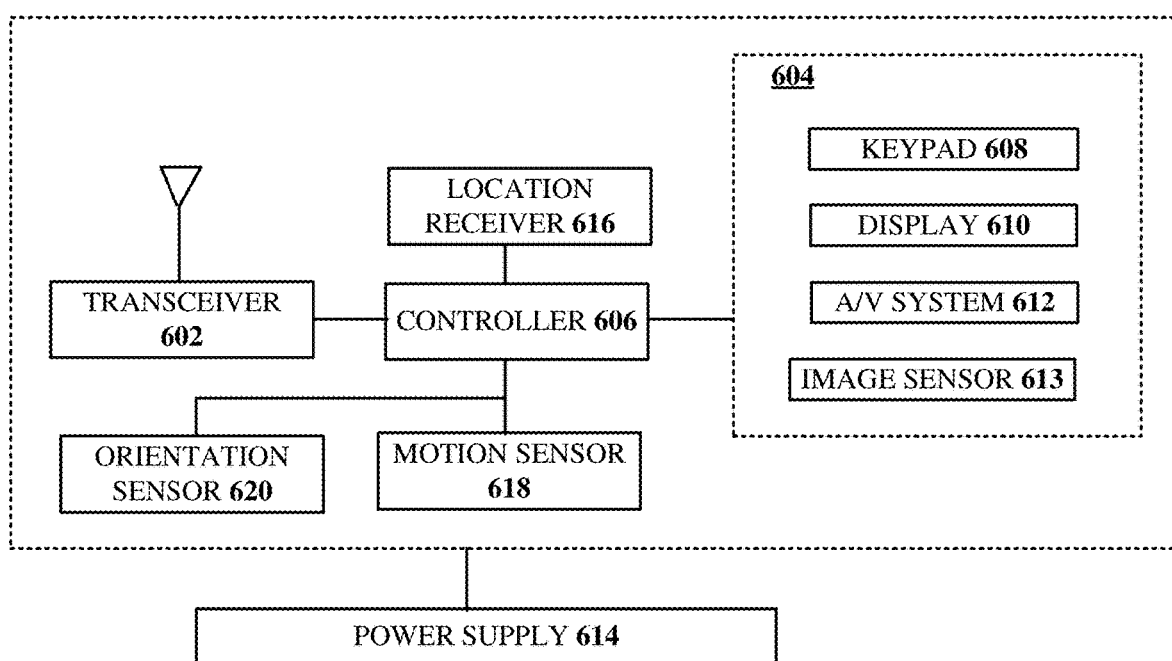
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. The communication device 600 can be a computing device integrated into the video server, mobile device/media device with video player, and virtual reality headset, described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
determining available bandwidth of a communication network;
transmitting an indication of the available bandwidth to a video server over the communication network;
identifying a field of vision of a user;
identifying a first group of field of vision (FOV) tiles of video content and a first group of out of sight (OOS) tiles of the video content based on the field of vision of the user, wherein a portion of each of the first group of FOV tiles is within the field of vision of the user and wherein each of the first group of OOS tiles are outside the field of vision of the user, wherein the first group of FOV tiles are received from the video server over the communication network and encoded using Advanced Video Coding (AVC), wherein the first group of OOS tiles are received from the video server over the communication network and encoded using a first layer of Scalable Video Coding (SVC), wherein the video server encodes the first group of FOV tiles using the AVC and encodes the first group of OOS tiles using the first layer of SVC based on the available bandwidth and the field of vision for the user;
providing the first group of FOV tiles and the first group of OOS tiles for presentation on a display, wherein the first group of FOV tiles is presented on the display during a first time period and the first group of OOS tiles is not presented on the display during the first time period;

detecting a change in the field of vision of the user, wherein the change is one of an actual change in the field of vision or a predicted change in the field of vision;

identifying a second group of FOV tiles of the video content, wherein the second group of FOV tiles comprises a portion of the first group of OOS tiles;

requesting the portion of the first group of OOS tiles;

receiving the portion of the first group of OOS tiles from the video server over the communication network, wherein the portion of the first group of OOS tiles are encoded using an enhancement layer of SVC; and providing, to the display, the portion of the first group of OOS tiles according to the enhancement layer in conjunction with the providing of the first group of OOS tiles according to the first layer resulting in a high resolution version of the portion of the first group of OOS tiles, wherein the high resolution version of the portion of the first group of OOS tiles is presented on the display during a second time period.

2. The device of claim 1, wherein the operations comprise identifying a version of the AVC used for the first group of FOV tiles, wherein the requesting of the portion of the first group of OOS tiles comprises requesting one or more enhancement layers of SVC for the portion of the first group of OOS tiles according to the version of the AVC used for the first group of FOV tiles from the video server, and wherein the receiving of the portion of the first group of OOS tiles comprises receiving the portion of the first group of OOS tiles from the video server over the communication network, wherein the portion of the first group of OOS tiles are encoded according to the one of more enhancements layers of SVC.

3. The device of claim 1, wherein the identifying of the second group of FOV tiles comprises identifying the second group of FOV tiles based on the change of the field of vision for the user.

4. The device of claim 1, wherein a virtual reality headset is communicatively coupled to the display.

5. The device of claim 1, wherein the detecting of the change in the field of vision comprises detecting a head movement of the user viewing the first group of FOV tiles.

6. The device of claim 5, wherein the identifying of the second group of FOV tiles comprises identifying the second group of FOV tiles according to the head movement of the user viewing the first group of FOV tiles.

7. The device of claim 1, wherein the detecting of the change in the field of vision comprises determining a content type of the video content, and wherein the identifying of the second group of FOV tiles comprises identifying the second group of FOV tiles according to the content type.

8. The device of claim 1, wherein the identifying of the second group of FOV tiles comprises:

retrieving historical information regarding a head movement of each of a plurality of users viewing the video content; and identifying the second group of FOV tiles according to the historical information.

9. The device of claim 1, wherein the detecting of the change in the field of vision comprises implementing machine learning techniques on viewing reaction of each of a plurality of users viewing the video content, and wherein the identifying of the second group of FOV tiles comprises identifying the second group of FOV tiles according to the machine learning techniques.

10. The device of claim 1, wherein the operations comprise identifying a third group of FOV tiles of the video content for a future viewing of the video content, wherein the third group of FOV tiles comprises the portion of the first group of OOS tiles.

11. The device of claim 1, wherein the operations comprise:

identifying the user viewing the video content; and determining a viewing history of the user.

12. The device of claim 11, wherein identifying of the second group of FOV tiles comprises identifying the second group of FOV tiles according to the viewing history of the user.

13. The device of claim 1, wherein the video content comprises 360 degree video content.

14. The device of claim 1, wherein the identifying of the second group of FOV tiles comprises:

identifying a focus object within the video content; and identifying the second group of FOV tiles according to the focus object.

15. A non-transitory, machine-readable medium, comprising executable instructions that, when executed by a processing system including a processor, facilitate performance of operations, the operations comprising:

determining available bandwidth of a communication network;

transmitting an indication of the available bandwidth to a video server over the communication network;

identifying a field of vision of a user;

identifying a first group of field of vision (FOV) tiles of video content and a first group of out of sight (OOS) tiles of the video content based on the field of vision of the user, wherein a portion of each of the group of FOV tiles is within the field of vision of the user and wherein each of group of OOS tiles are outside the field of vision of the user, wherein the first group of FOV tiles are received from the video server over the communication network and encoded using Advanced Video Coding (AVC), wherein the first group of OOS tiles are received from the video server over the communication network and encoded using a first layer of Scalable Video Coding (SVC), wherein the video server encodes the first group of FOV tiles using the AVC and encodes the first group of OOS tiles using the first layer of SVC based on the available bandwidth and the field of vision of the user;

providing the first group of FOV tiles and the first group of OOS tiles for presentation on a display communicatively coupled to a virtual reality headset, the first group of FOV tiles is presented on the display for viewing via the virtual reality headset during a first time period and the first group of OOS tiles is not presented on the display during the first time period;

detecting a change in the field of vision of the user, wherein the change is one of an actual change in the field of vision or a predicted change in the field of vision;

identifying a second group of FOV tiles of the video content, wherein the second group of FOV tiles comprises a portion of the first group of OOS tiles;

identifying a version of the AVC used for the first group of FOV tiles;

requesting the portion of the first group of OOS tiles;

receiving the portion of the first group of OOS tiles from the video server over the communication network, wherein the portion of the first group of OOS tiles are encoded using one or more enhancement layers of SVC according to the version of the AVC; and providing, to the display, the portion of the first group of OOS tiles according to the enhancement layer in conjunction with the providing of the first group of OOS tiles according to the first layer resulting in a high resolution version of the portion of the first group of OOS tiles, wherein the high resolution version of the portion of the first group of OOS tiles is presented on the display for viewing via the virtual reality headset during a second time period.

16. The non-transitory, machine-readable medium of claim 15, wherein the identifying of the second group of FOV tiles comprises identifying the second group of FOV tiles based on the change of the field of vision for the user.

17. The non-transitory, machine-readable medium of claim 15, wherein the video content comprises 360 degree video content.

18. The non-transitory, machine-readable medium of claim 15, wherein the detecting of the change in the field of vision comprises detecting a head movement of the user viewing the first group of FOV tiles, and wherein the identifying of the second group of FOV tiles comprises identifying the second group of FOV tiles according to the head movement of the user viewing the first group of FOV tiles.

19. A method, comprising:
  determining, by a processing system including a processor, available bandwidth of a communication network;
  transmitting, by the processing system, an indication of the available bandwidth to a video server over the communication network;
  identifying, by the processing system, a field of vision of a user;
  identifying, by the processing system, a first group of field of vision (FOV) tiles of video content and a first group of out of sight (OOS) tiles of the video content based on the field of vision of the user, wherein a portion of each of the group of FOV tiles is within the field of vision of the user and wherein each of group of OOS tiles are outside the field of vision of the user, wherein the first group of FOV tiles are received from the video server over the communication network and encoded using Advanced Video Coding (AVC), wherein the first group of OOS tiles are received from the video server over the communication network and encoded using a first layer of Scalable Video Coding (SVC) according to the available bandwidth of the communication network, wherein the video server encodes the first group of FOV tiles using the AVC and encodes the first group of OOS tiles using the first layer of SVC based on the available bandwidth and the field of vision of the user;
  providing, by the processing system, the first group of FOV tiles and the first group of OOS tiles for presentation on a display communicatively coupled to a virtual reality headset, wherein the first group of FOV tiles is presented on the display for viewing via the virtual reality headset during a first time period and the first group of OOS tiles is not presented on the display during the first time period;
  detecting, by the processing system, a change in the field of vision of the user, wherein the change is detected using machine learning techniques;
  identifying, by the processing system, a second group of FOV tiles of the video content, wherein the second group of FOV tiles comprises a portion of the first group of OOS tiles;
  receiving, by the processing system, the portion of the first group of OOS tiles from the video server over the communication network, wherein the portion of the first group of OOS tiles are encoded using an enhancement layer of SVC; and
  providing, by the processing system, to the display, the portion of the first group of OOS tiles according to the enhancement layer in conjunction with the providing of the first group of OOS tiles according to the first layer resulting in a high resolution version of the portion of the first group of OOS tiles, wherein the high resolution version of the portion of the first group of OOS tiles is presented on the display for viewing via the virtual reality headset during a second time period.

20. The method of claim 19, wherein the detecting of the change in the field of vision of the user comprises determining, by the processing system, a content type of the video content, and wherein the identifying of the second group of FOV tiles comprises identifying, by the processing system, the second group of FOV tiles according to the content type.

* * * * *